United States Patent
Browning et al.

(10) Patent No.: US 10,059,090 B1
(45) Date of Patent: Aug. 28, 2018

(54) LABEL STACKING MACHINE AND METHOD

(71) Applicant: Electronic Imaging Services, Inc., Little Rock, AR (US)

(72) Inventors: Paul Browning, Morrilton, AR (US); Gene Bethards, Benton, AR (US); Scott Aten, Little Rock, AR (US); Brian LeFevre, Aurora, CO (US); Patrick Cross, Golden, CO (US)

(73) Assignee: Electronic Imaging Services, Inc., Little Rock, AR (US)

( * ) Notice: Subject to any disclaimer, the term of this patent is extended or adjusted under 35 U.S.C. 154(b) by 313 days.

(21) Appl. No.: 15/131,202

(22) Filed: Apr. 18, 2016

Related U.S. Application Data

(63) Continuation of application No. 14/843,337, filed on Sep. 2, 2015, now Pat. No. 9,376,286.
(Continued)

(51) Int. Cl.
*B31D 1/02* (2006.01)
*B32B 38/04* (2006.01)
(Continued)

(52) U.S. Cl.
CPC ...... *B32B 38/0004* (2013.01); *B32B 37/1018* (2013.01); *B31D 1/0075* (2013.01);
(Continued)

(58) Field of Classification Search
CPC ......... Y10T 156/1761; Y10T 156/1768; Y10T 156/1075; Y10T 156/1062;
(Continued)

(56) References Cited

U.S. PATENT DOCUMENTS

| 237,223 A | 2/1881 | Wight |
|---|---|---|
| 3,615,474 A | 10/1971 | Rosenberger |

(Continued)

FOREIGN PATENT DOCUMENTS

| WO | 97/05556 | 2/1997 |
|---|---|---|
| WO | 2012009755 | 1/2012 |

OTHER PUBLICATIONS

International Search Report for PCT/US2014/042271 dated Oct. 1, 2014.
(Continued)

*Primary Examiner* — Linda Lamey Gray
(74) *Attorney, Agent, or Firm* — Morgan Lewis & Bockius LLP

(57) ABSTRACT

A method of making a pad of labels comprises: printing display information on a top surface of a substrate; affixing a first layer of lamination material to a bottom surface of the substrate; affixing a second layer of lamination material to the top surface of the substrate, the second layer of lamination material having a release coating applied to a top surface thereof; applying an adhesive strip to a bottom surface of the first layer of lamination material, the adhesive strip being covered by a liner material; cutting the substrate having first and second layers of lamination material affixed into at least one label; removing the liner material to expose the adhesive strip after cutting the substrate into at least one label; and arranging the labels into a pad of labels.

6 Claims, 16 Drawing Sheets

Related U.S. Application Data

(60) Provisional application No. 62/044,598, filed on Sep. 2, 2014.

(51) Int. Cl.
| | | |
|---|---|---|
| *G02F 3/02* | (2006.01) | |
| *B32B 38/00* | (2006.01) | |
| *B32B 37/10* | (2006.01) | |
| *B31D 1/00* | (2017.01) | |
| *B65H 35/00* | (2006.01) | |
| *B65G 57/04* | (2006.01) | |
| *G09F 3/03* | (2006.01) | |
| *B65H 37/04* | (2006.01) | |

(52) U.S. Cl.
CPC .............. *B31D 1/026* (2013.01); *B31D 1/027* (2013.01); *B32B 2519/00* (2013.01); *B65G 57/04* (2013.01); *B65H 35/0013* (2013.01); *B65H 35/0073* (2013.01); *B65H 37/04* (2013.01); *G09F 3/03* (2013.01); *Y10T 156/1052* (2015.01); *Y10T 156/1062* (2015.01); *Y10T 156/1075* (2015.01); *Y10T 156/1761* (2015.01); *Y10T 156/1768* (2015.01)

(58) Field of Classification Search
CPC .......................... Y10T 156/1052; B31D 1/021; B31D 1/0075; B31D 1/0062; B31D 1/026; B31D 1/027; B32B 37/1248; B32B 37/1292; B32B 37/12; B32B 37/14; B32B 37/16; B32B 37/18; B32B 2038/045; B32B 38/0004; B32B 38/04; B32B 38/18; B32B 38/1808; G09F 3/02; G09F 2003/0208; G09F 2003/0241; G09F 2003/0214; G09F 3/10
See application file for complete search history.

(56) References Cited

U.S. PATENT DOCUMENTS

| | | |
|---|---|---|
| 3,630,513 A | 12/1971 | Anderson et al. |
| 3,658,364 A | 4/1972 | DaMert |
| 3,660,187 A | 5/1972 | Shortway et al. |
| 3,663,007 A | 5/1972 | Preiter |
| 3,692,301 A | 9/1972 | Wetter |
| 3,802,955 A | 4/1974 | Lindlaw et al. |
| 3,816,232 A | 6/1974 | Meiser |
| 3,912,569 A | 10/1975 | Kapral |
| 4,015,837 A | 4/1977 | Ostler |
| 4,029,310 A | 6/1977 | Reist |
| 4,259,788 A | 4/1981 | Wilson |
| 4,265,437 A | 5/1981 | Reist et al. |
| 4,277,427 A | 7/1981 | Kaminski et al. |
| 4,278,483 A | 7/1981 | Monsolillo |
| 4,281,762 A | 8/1981 | Hattemer |
| 4,284,453 A | 8/1981 | Endrizzi |
| 4,302,497 A | 11/1981 | Toyooka et al. |
| 4,307,830 A | 12/1981 | Didde |
| 4,409,870 A | 10/1983 | Rynik et al. |
| 4,452,114 A | 6/1984 | Rynik |
| 4,533,132 A | 8/1985 | Wangermann |
| 4,590,109 A | 5/1986 | Holmberg |
| 4,759,797 A | 7/1988 | Umeda et al. |
| 4,796,556 A | 1/1989 | Bird |
| 4,841,903 A | 6/1989 | Bird |
| 5,021,273 A | 6/1991 | Kobayashi |
| 5,031,773 A | 7/1991 | Manico et al. |
| 5,050,792 A | 9/1991 | Segall |
| 5,172,314 A | 12/1992 | Poland et al. |
| 5,182,152 A | 1/1993 | Ericson et al. |
| 5,209,807 A | 5/1993 | Fry |
| 5,244,525 A | 9/1993 | Neuwirth |
| 5,248,135 A | 9/1993 | Leu |
| 5,284,689 A | 2/1994 | Laurash et al. |
| 5,293,698 A | 3/1994 | Petersen |
| 5,324,078 A | 6/1994 | Bane |
| 5,397,117 A | 3/1995 | Mertens |
| 5,407,729 A | 4/1995 | Verden et al. |
| 5,518,762 A | 5/1996 | Soltysiak et al. |
| 5,628,501 A | 5/1997 | Meier |
| 5,671,006 A | 9/1997 | Billiot |
| 5,674,334 A | 10/1997 | Instance |
| 5,682,698 A | 11/1997 | Bevins |
| 5,707,713 A | 1/1998 | Langan et al. |
| 5,709,297 A | 1/1998 | Brandriff et al. |
| 5,730,056 A | 3/1998 | Schmitt |
| 5,751,919 A | 5/1998 | Goodwin, III |
| 5,727,890 A | 9/1998 | Stodder et al. |
| 5,803,260 A | 9/1998 | Tilton |
| 5,810,347 A | 9/1998 | Wingate |
| 5,819,655 A | 10/1998 | Dellivenneri et al. |
| 5,846,582 A | 12/1998 | Mayfield et al. |
| 5,964,149 A | 10/1999 | Venneri et al. |
| 5,967,343 A | 10/1999 | Dufresne |
| 6,016,913 A | 1/2000 | Tilton |
| 6,040,026 A | 3/2000 | Iwabuchi et al. |
| 6,045,893 A | 4/2000 | Fukushima et al. |
| 6,050,192 A | 4/2000 | Kipphen et al. |
| 6,071,583 A | 6/2000 | Pomerantz |
| 6,074,747 A | 6/2000 | Scholz |
| 6,089,777 A | 7/2000 | Wong |
| 6,105,955 A | 8/2000 | Rawlings et al. |
| 6,106,917 A | 8/2000 | Pereira et al. |
| 6,119,594 A | 9/2000 | Kipphan et al. |
| 6,145,232 A | 11/2000 | Bevins |
| 6,163,996 A | 11/2000 | Gebka |
| 6,179,335 B1 | 1/2001 | DeLise, Jr. |
| 6,186,555 B1 | 2/2001 | Rawlings |
| 6,217,443 B1 | 4/2001 | Green, Jr. |
| 6,254,955 B1 | 7/2001 | Kuo et al. |
| 6,269,342 B1 | 7/2001 | Brick et al. |
| 6,281,795 B1 | 8/2001 | Smith et al. |
| 6,286,871 B1 | 9/2001 | Spector et al. |
| 6,360,465 B1 | 3/2002 | Simpson |
| 6,364,363 B1 | 4/2002 | Stober et al. |
| 6,385,885 B1 | 5/2002 | Valiulis |
| 6,403,189 B1 | 6/2002 | Donahue |
| 6,408,553 B1 | 6/2002 | Brown et al. |
| 6,488,999 B1 | 12/2002 | Flynn et al. |
| 6,579,585 B1 | 6/2003 | Garvic et al. |
| 6,627,285 B2 | 9/2003 | Kuo et al. |
| 6,632,316 B1 | 10/2003 | Garvic |
| 6,701,653 B2 | 3/2004 | Chess et al. |
| 6,703,096 B2 | 3/2004 | Sabella |
| 6,817,127 B2 | 11/2004 | Gottlieb et al. |
| 6,897,763 B2 | 5/2005 | Schulmerich et al. |
| 6,926,942 B2 | 8/2005 | Garvic et al. |
| 6,981,343 B2 | 1/2006 | Rawlings et al. |
| 6,986,463 B2 | 1/2006 | Ludtke |
| 7,191,951 B2 | 3/2007 | Hanyu et al. |
| 7,287,001 B1 | 10/2007 | Falls et al. |
| 7,309,731 B2 | 12/2007 | Shih et al. |
| 7,340,855 B2 | 3/2008 | Wiltfang et al. |
| D576,485 S | 9/2008 | Koza |
| 7,426,798 B2 | 9/2008 | Kooman et al. |
| 7,440,903 B2 | 10/2008 | Riley et al. |
| 7,533,036 B2 | 5/2009 | Bamberg et al. |
| D608,395 S | 1/2010 | Engelby et al. |
| D623,235 S | 9/2010 | Engelby et al. |
| D623,236 S | 9/2010 | Engelby et al. |
| 7,802,388 B2 | 9/2010 | Henkel et al. |
| D630,257 S | 1/2011 | Engelby et al. |
| 7,885,865 B2 | 2/2011 | Benson et al. |
| 7,957,998 B2 | 6/2011 | Riley et al. |
| 7,975,416 B2 | 7/2011 | Engelby et al. |
| 7,992,334 B1 | 8/2011 | Engelby et al. |
| 8,011,126 B2 | 9/2011 | Nunez et al. |
| 8,020,765 B2 | 9/2011 | Nunez et al. |
| 8,171,663 B1 | 5/2012 | Engelby et al. |
| 8,261,477 B1 | 9/2012 | Wilkinson et al. |
| 8,302,338 B2 | 11/2012 | Engelby et al. |
| 8,322,062 B1 | 12/2012 | Engelby et al. |

(56) References Cited

U.S. PATENT DOCUMENTS

| | | |
|---|---|---|
| D676,484 S | 2/2013 | Bratter et al. |
| D676,485 S | 2/2013 | Bratter et al. |
| D676,490 S | 2/2013 | Bratter et al. |
| 8,528,731 B2 | 9/2013 | Bratter et al. |
| 8,613,156 B2 | 12/2013 | Nunez et al. |
| 8,626,613 B2 | 1/2014 | Dale et al. |
| 8,762,212 B2 | 6/2014 | Falls et al. |
| 8,806,797 B1 | 8/2014 | Engelby et al. |
| 8,836,990 B1 | 9/2014 | Dale et al. |
| 8,885,204 B1 | 11/2014 | Dale et al. |
| 8,910,864 B2 | 12/2014 | Falls et al. |
| 8,928,923 B2 | 1/2015 | Nunez |
| 8,970,893 B1 | 3/2015 | Dale et al. |
| 9,199,427 B2 | 12/2015 | Weidauer et al. |
| 9,259,891 B2 | 2/2016 | Weidauer et al. |
| 2002/0198892 A1 | 12/2002 | Rychel et al. |
| 2004/0101646 A1 | 5/2004 | Hodsdon et al. |
| 2005/0081417 A1 | 4/2005 | Valiulis |
| 2006/0010743 A1 | 1/2006 | Fowler et al. |
| 2007/0025303 A1 | 2/2007 | Koomen et al. |
| 2007/0070389 A1 | 3/2007 | Hidaka |
| 2007/0288296 A1 | 12/2007 | Lewis |
| 2008/0095963 A1 | 4/2008 | Robbins |
| 2008/0095964 A1 | 4/2008 | Wilkinson et al. |
| 2008/0108491 A1 | 5/2008 | Wilkinson et al. |
| 2008/0164310 A1 | 7/2008 | Dupuy et al. |
| 2008/0281712 A1 | 11/2008 | Fuzell-Casey et al. |
| 2009/0234668 A1 | 9/2009 | Wheeler |
| 2010/0116425 A1 | 5/2010 | Konsti et al. |
| 2010/0205837 A1 | 8/2010 | Engelby et al. |
| 2011/0066458 A1 | 3/2011 | Dale et al. |
| 2011/0232144 A1 | 9/2011 | Engelby et al. |
| 2011/0259775 A1 | 10/2011 | Bratter et al. |
| 2011/0283578 A1 | 11/2011 | Engelby et al. |
| 2012/0018098 A1 | 1/2012 | Henderson |
| 2012/0022913 A1 | 1/2012 | Volkmann et al. |
| 2012/0250036 A1 | 10/2012 | Hatta et al. |
| 2012/0315422 A1 | 12/2012 | Cushing et al. |
| 2013/0144757 A1 | 6/2013 | Bauer et al. |
| 2013/0173435 A1 | 7/2013 | Cozad, Jr. |
| 2013/0221651 A1 | 8/2013 | Bratter et al. |
| 2014/0324736 A1 | 10/2014 | Engelby |
| 2014/0366413 A1 | 12/2014 | Weidauer et al. |
| 2014/0366414 A1 | 12/2014 | Weidauer et al. |
| 2014/0367017 A1 | 12/2014 | Blackwell et al. |
| 2014/0367034 A1 | 12/2014 | Weidauer et al. |
| 2014/0367472 A1 | 12/2014 | Weidauer et al. |
| 2014/0367956 A1 | 12/2014 | Wilkinson et al. |
| 2015/0000819 A1 | 1/2015 | Blackwell et al. |
| 2015/0043016 A1 | 2/2015 | Randall et al. |
| 2015/0088701 A1 | 3/2015 | Desmarais et al. |

OTHER PUBLICATIONS

ADCO Marketing; Post-it Custom Printed Pop-Up Notes; https://web.archive.org/web/20111114143246/http://www.adcomarketing.com/Product/Post-It-3M-Pop-up-Notes.aspx, Nov. 14, 2011.
Executive White Paper: Time, Money and the Customer Experience (Vestcom International, Inc.) (Jan. 2009).
White Paper: The "Single-Pass" Shelf Part 1 (Vestcom) (Feb. 2012).
White Paper: The "Single-Pass" Shelf Part 2 (Vestcom) (Feb. 2012).
"On the Cutting Edge", Bob Ingram, Progressive Grocer (Sep. 2013).

LABEL STACKING MACHINE AND METHOD

CROSS-REFERENCE TO RELATED APPLICATIONS

This application is a continuation of U.S. patent Ser. No. 14/843,337 filed on Sep. 2, 2015, entitled "Label Stacking Machine and Method" which claims the benefit of U.S. Provisional Patent Application No. 62/044,598 filed Sep. 2, 2014 entitled "Robotic Means Used in the Process of Making a Sheet of Labels", both of which are incorporated by reference herein in their entirety.

BACKGROUND OF THE INVENTION

The present invention generally relates to machines and methods for stacking a plurality of labels. In some embodiments, the present invention relates to machines and methods for stacking sheets of labels into pads of labels for use on store shelves in a retail environment.

BRIEF SUMMARY OF THE INVENTION

In one embodiment there is a method of making a pad of labels comprising: providing a substrate having printed display material on a top surface of the substrate, a first layer of lamination material on a bottom surface of the substrate, a second layer of lamination material having a release coating on the top surface of the substrate, and an adhesive strip on the bottom surface of the substrate, the adhesive strip being covered by a liner material; cutting the substrate into at least one label; removing the liner material to expose the adhesive strip after cutting the substrate into at least one label; and arranging the at least one label into a pad of labels. In one embodiment, the at least one label include a sheet of labels, and the cutting step includes cutting through the substrate and the first and second layer of lamination material around an entire outer perimeter of a plurality of partially connected labels. In one embodiment, the cutting step includes cutting through the substrate along a majority of a boundary between adjacent labels leaving one or more ties to partially connect adjacent labels. In one embodiment, the cutting step includes partially cutting the at least one label proximate the adhesive strip such that the liner material is at least partially intact across the sheet of labels.

In a further embodiment, the method of making a pad of labels comprises pulling the at least partially intact liner downwardly from the at least one labels and winding the at least partially intact liner onto a spool. In a further embodiment, the method of making a pad of labels comprises pulling a trim surrounding the entire outer perimeter of the plurality of partially connected labels upwardly from the plurality of partially connected labels and winding the trim onto a spool. In one embodiment, the cutting step is performed using a rotary die. In one embodiment, the rotary die includes a plurality of cutting edges, at least one of the plurality of cutting edges extending radially further from the rotary die than another one of the plurality of cutting edges. In a further embodiment, the method of making a pad of labels comprises transporting the at least one label to a stacking station using a transfer conveyor having non-stick coated rollers. In one embodiment, transporting the at least one label includes using a robot arm having a vacuum pick-head to lift the at least one label and place the at least one label onto the top of the pad of labels. In one embodiment, the printing, cutting, and arranging steps are controlled with reference to a store's planogram, such that the pad of labels is sequenced according to the store's planogram. In a further embodiment, the method of making a pad of labels comprises printing the display information on the top surface of the substrate; affixing the first layer of lamination material to the bottom surface of the substrate; affixing the second layer of lamination material to the top surface of the substrate; and applying the adhesive strip to the bottom surface of the first layer of lamination material.

In another embodiment there is a method of making a pad of labels comprising: providing a substrate having printed display material on a top surface of the substrate, a first layer of lamination material on a bottom surface of the substrate, a second layer of lamination material having a release coating on the top surface of the substrate, and an adhesive strip on the bottom surface of the substrate, the adhesive strip being covered by a liner material; cutting the substrate having first and second layers of lamination material affixed into at least one label; removing the liner material to expose the adhesive strip; transporting the at least one label to a stacking station; lifting the at least one label from the stacking station by applying a vacuum force to a top surface of the at least one label; moving the at least one label over a stack of labels; and releasing the vacuum force to the top surface of the at least one label to arrange the at least one label into a pad of labels.

In one embodiment, transporting the at least one label includes using a transfer conveyor having non-stick coated rollers. In a further embodiment, the method of making a pad of labels comprises blowing air onto the at least one label during transporting of the at least one label to the stacking station. In one embodiment, the stacking station includes at least one recess that aligns with the adhesive strip to prevent the adhesive strip from contacting the stacking station. In one embodiment, the vacuum force is applied using a robot arm, the robot arm including a pick-head having a foam pad. In one embodiment, the foam pad includes a plurality of apertures.

In another embodiment, there is a device for stacking a plurality of partially connected labels into a plurality of partially connected pads of labels, comprising: a robot arm having at least one vacuum source configured to selectively supply a vacuum force; a plate coupled to the robot arm; and a flexible pad coupled to the plate and including a plurality of apertures configured to direct the majority of the vacuum force through the flexible pad to a surface of the plurality of partially connected labels. In one embodiment, the flexible pad includes a layer of closed cell foam and a layer of open cell foam. In one embodiment, the apertures are approximately 5 mm in diameter. In one embodiment, the vacuum force is approximately 10 psi.

BRIEF DESCRIPTION OF THE SEVERAL VIEWS OF THE DRAWINGS

The foregoing summary, as well as the following detailed description of embodiments of the label stacking machine and method, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE INVENTION

Described herein are embodiments of a machine and method for stacking a plurality of labels into a pad of labels. In some embodiments, the machine and/or method relates to stacking a sheet of labels into a plurality of pads of labels that are partially connected to one another. In some embodiments, the labels are for use on store shelves in a retail environment. In particular embodiments, the pads of labels are preprinted and sequenced according to a retail store's planogram. The pads of labels may allow for a system of labels that does not require: (1) breaking down a sheet of labels by tearing along label-removal perforations; (2) sorting individual labels; and (3) containerizing or bundling the individual labels. Furthermore, because the labels may be peeled directly from a pad of peel-and-stick labels, there is no separate release liner utilized that must be removed from each individual label and discarded during use.

Figure 1:
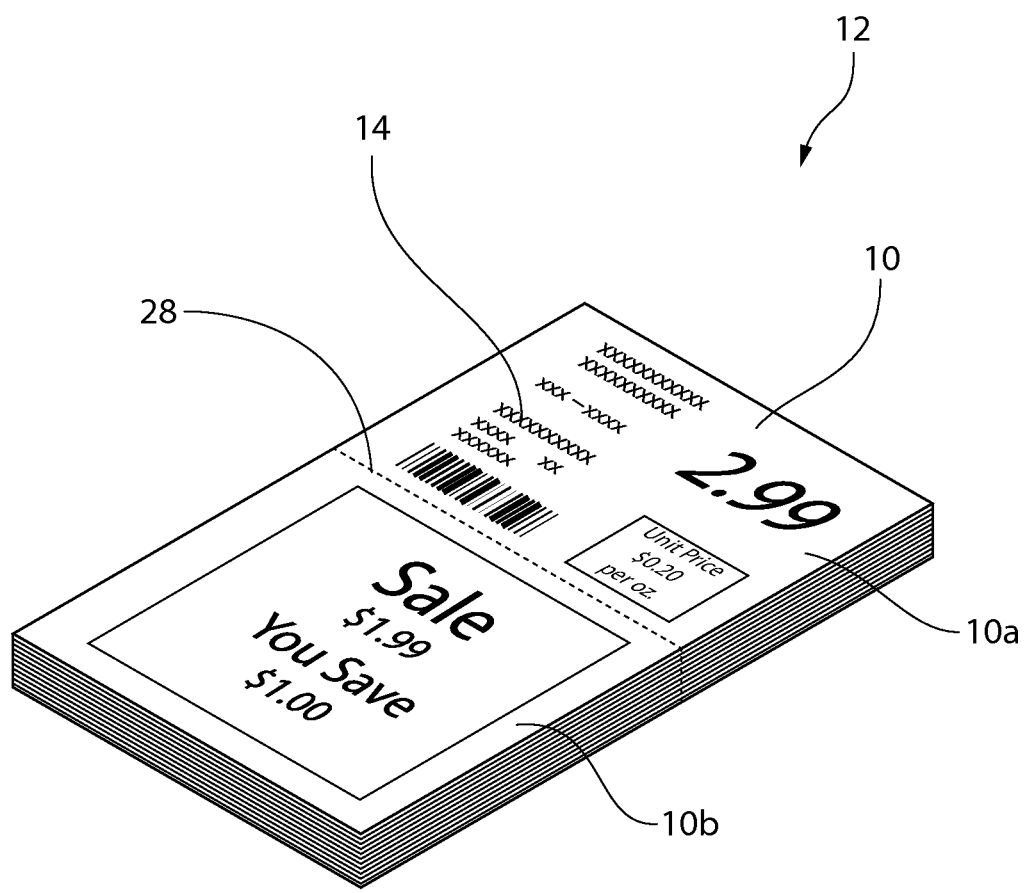
FIG. 1 is a perspective view of a pad of labels having display information printed on a top surface of the labels in accordance with an exemplary embodiment of the present invention.
Figure 2:
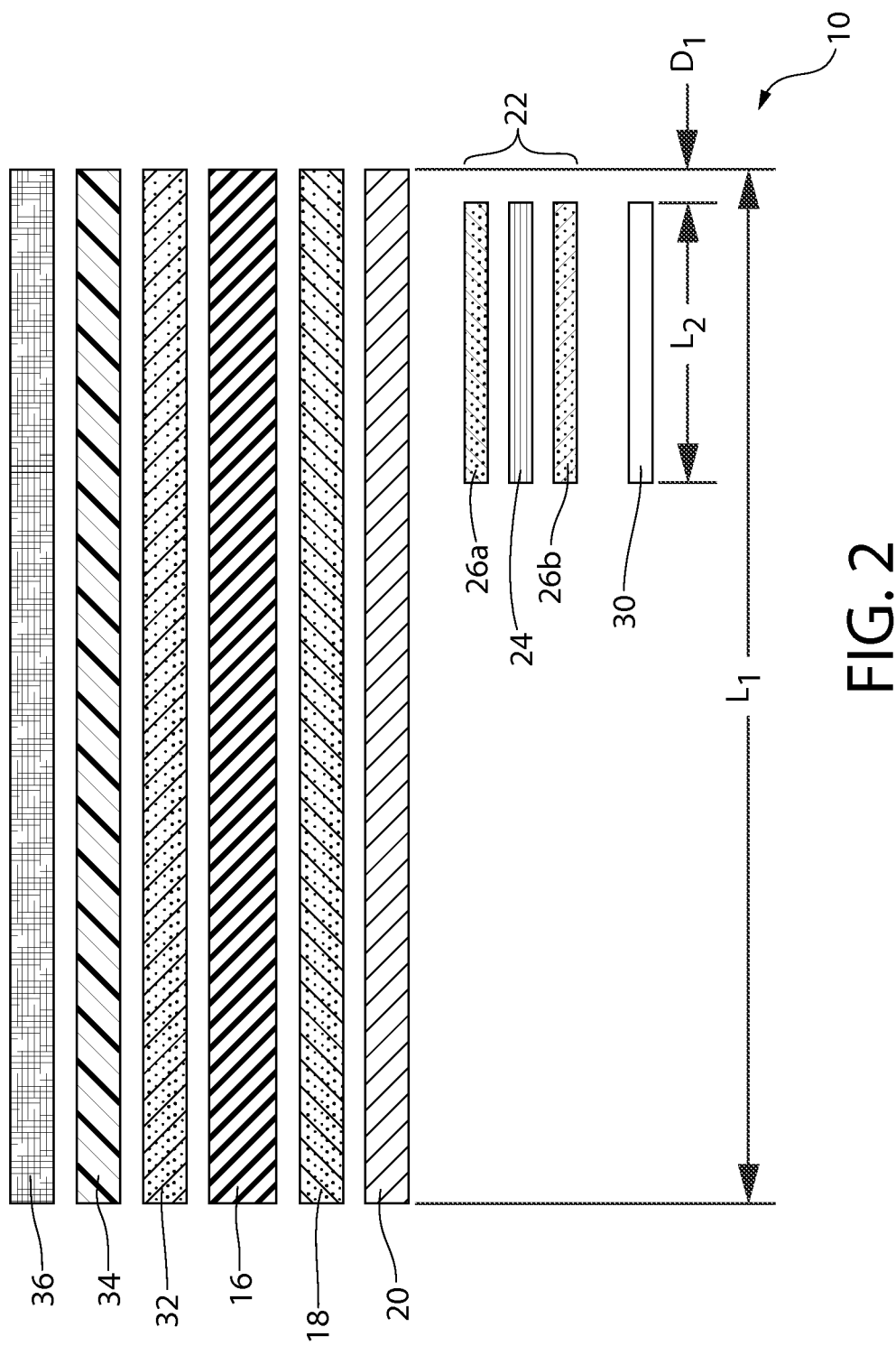
FIG. 2 is a cross-sectional and exploded view of one of the labels shown in FIG. 1.
Figure 3:
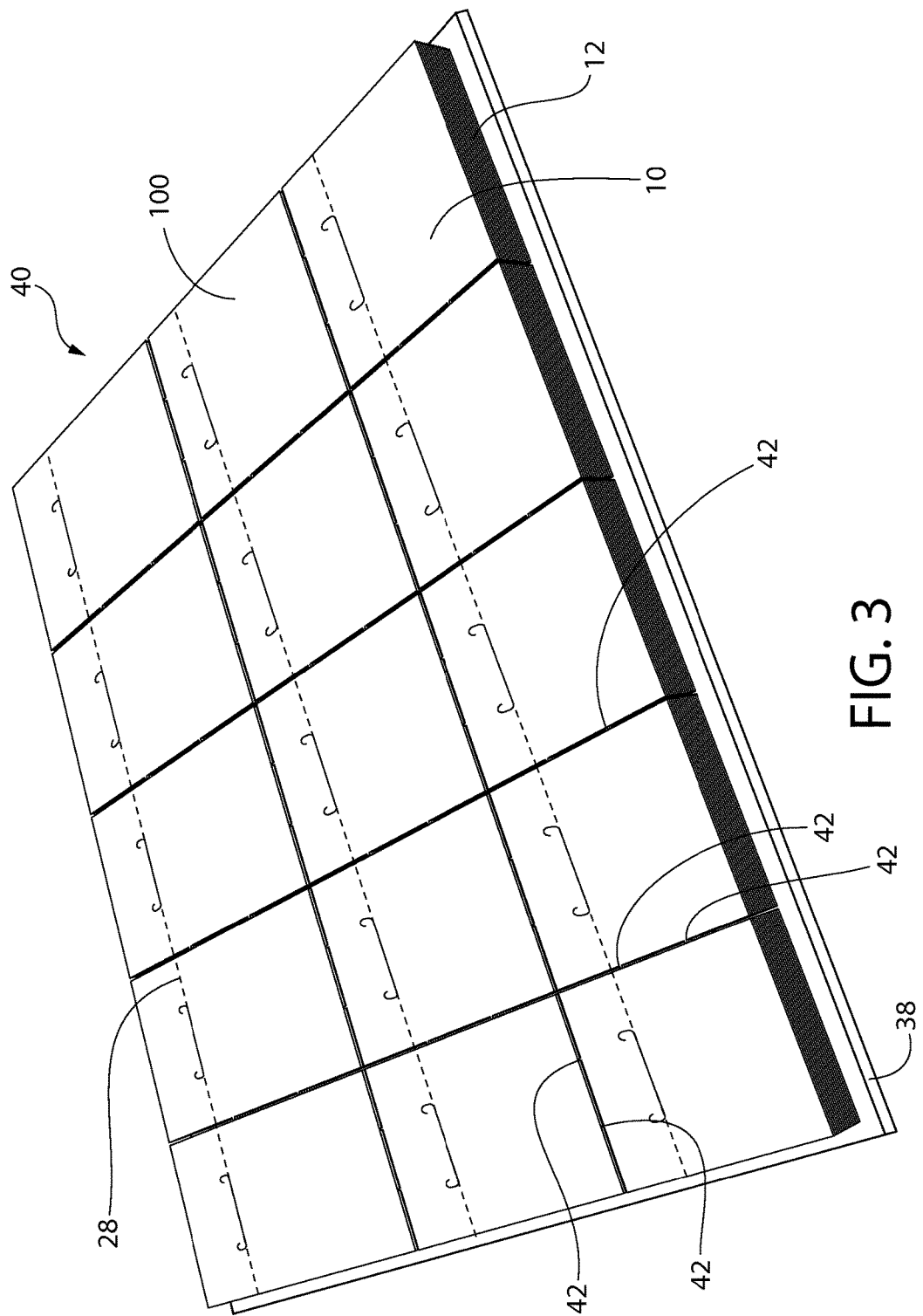
FIG. 3 is a perspective view of a plurality of pads of labels on a support surface in accordance with an exemplary embodiment of the present invention with the display information removed.

An embodiment of the present invention includes a label 10 as depicted in FIGS. 1-3. Specifically, FIG. 1 shows a pad of a plurality of vertically stacked labels 12 (herein referred to as pad or pad of labels) having display information 14 printed so as to be visible on the top surface of the label 10. The display information 14 may include, without limitation, product information, descriptions, marketing content, store and shelf location, pricing, discounts and promotions, UPCs and bar codes, and/or effective dates. In some embodiments, the label 10 is approximately 2.5 inches wide and approximately 3.5 inches long. In one embodiment, the label 10 is approximately 1.625 to approximately 2.625 inches wide and approximately 1.219 to approximately 4.0 inches long.

Each pad 12 may include any number of labels. In some embodiments, each pad 12 includes approximately 10-150 labels.

FIG. 2 shows a cross-sectional view of a label 10 according to an exemplary embodiment. The label 10 may include a paper substrate 16. In one embodiment, paper substrate 16 is a 20 lb bond paper, sourced as sheets measuring 11-inches long and 14-inches wide. However, an array of paper products, available in various weights and provided as continuous rolls or sheets of various sizes, may serve as the paper substrate 16. Furthermore, the paper substrate 16 material may be chosen from a variety of natural and synthetic materials known within the art, including without limitation, paper, vinyl, plastic films or foils, fabrics, and textiles.

The label 10 may also include a layer of adhesive 18 affixing a first layer of lamination material 20 to a bottom surface of the paper substrate 16. According to one embodiment, the first layer of lamination material 20 comprises a layer of polypropylene or polyester film. However, the first layer of lamination material 20 may be chosen from a variety of lamination materials such as polypropylene films include "410" sourced from ACPO, Ltd. and "812C film" sourced from QSPAC Industries, Inc., and an exemplary polyester film is "609" sourced from ACPO, Ltd. These products are clear films that include the layer of adhesive 18 already applied on one surface. Thus, when one of these products is selected for use as the first layer of lamination material 20, affixing the first layer of lamination material 20 involves applying the polypropylene or polyester film to the bottom surface of the paper substrate 16 using the pre-applied adhesive 18. Polypropylene and polyester films provide the advantage of allowing an adhesive strip 22 to permanently adhere to a bottom surface of the first layer of lamination material 20. Thus, the adhesive strip 22 may stay entirely on the bottom surface of a label 10 when it is peeled from a pad of labels 12, with little to no adhesive residue left behind on the top surface of the label 10 directly below.

A first portion 10a of the label 10 may be affixed to an article such as a shelf, while a second portion 10b of the label 10 may hangs below the shelf (see FIG. 1). A relief perforation 28 may extend between the first portion 10a from the second portion 10b to allow the second portion 10b to be removed from the first portion 10a. Thus, the adhesive strip 22 may be applied to the bottom surface of the first layer of lamination material 20 only in an area corresponding to the first portion 10a of the label 10, which is to be affixed to the shelf. In one embodiment, a top edge of the adhesive strip 22 is applied at a distance (D1) approximately ⅛ of an inch from a top edge of the label 10. The distance D1 may vary approximately +/−1/16 of an inch. The adhesive strip 22 may have a height L2 ranging from approximately ⅝ of an inch to approximately 1 inch, and its width may continue for the full width of the label 10.

In one embodiment, the adhesive strip 22 is a double-coated tape comprising a layer of polyester film 24 having layers of adhesive 26a, 26b pre-applied on top and bottom surfaces thereof. However, the adhesive strip 22 may be chosen from a variety of materials including without limitation, pattern-coated adhesives or double-coated tapes utilizing various substrate materials, such as paper, vinyl, plastic films or foils (including polyester and polypropylene), fabrics, and textiles.

Examples of adhesive strips 120 include "FT 8380" and "FT 9380" products sourced from Avery Denison Corporation. These products are double-coated polyester tapes available in various widths, but commonly sourced in widths ranging from ⅝ inch to 1 inch, and designed for clean removability. Both of these products may include a release liner 30 installed on the outer facing adhesive surface. The release liner 30 may be removed from the adhesive surface during the manufacturing process as discussed below. FT 8380 and FT 9380 are standard adhesive strips 120 that have proven reliable for adhering labels 10 to store shelves, while still allowing for any necessary repositioning. The FT 9380 product is a more aggressive adhesive strip 22, suitable for use in applications where label adhesion may present challenges.

In one embodiment, a layer of adhesive 32 affixes a second layer of lamination material 34 to a top surface of the paper substrate 16. In one embodiment, the second layer of lamination material 34 comprises a layer of polyester film. However, the second layer of lamination material 34 may be chosen from a variety of lamination materials known in the art. The label 10 may further incorporate a release coating 36 on a top surface of the second layer of lamination material 34. In one embodiment, the release coating 36 comprises a silicone coating, which covers the entire top surface of the second layer of lamination material 34. The release coating 36 may allow each label 10 to function as the release liner 30 for the label 10 directly above it once the release liner 30 has been removed and the labels 10 are stacked on top of one another. That is, the release coating 36 may allow the adhesive strip 22 permanently affixed to the bottom surface of one label 10 to be cleanly and easily peeled from the top surface of the label 10 directly beneath it in a pad 12, without any risk of tearing the labels 10 or leaving a substantially about if any adhesive residue behind.

An exemplary polyester film that, according to the depicted embodiment, may be selected for use as the second layer of lamination material 34 includes "Hostaphan 2SLKN" sourced from Mitsubishi Polyester Film, Inc. This product is a clear polyester film, available in multiple thicknesses and commonly sourced in 92 and 102 gauge thicknesses. Hostaphan 2SLKN comes pre-coated on one surface with a silicone release coating 36. Thus, when Hostaphan 2SLKN is selected for use as the second layer of lamination material 34, adhesive 32 may be applied to the film's surface opposite the silicone release coating 36. Alternatively, the adhesive 32 may be applied to the top surface of the paper substrate 16. The Hostaphan 2SLKN may then be applied to the top surface of the paper substrate 16 using the adhesive 18. There may be no need to apply a release coating 36 because Hostaphan 2SKLN comes with a silicone release coating 36 pre-applied. Additional embodiments of the label 10 and pad 12 may be found in U.S. Patent Application Publication No. 2014/0367017 which is hereby incorporated by reference in its entirety.

Figure 4:
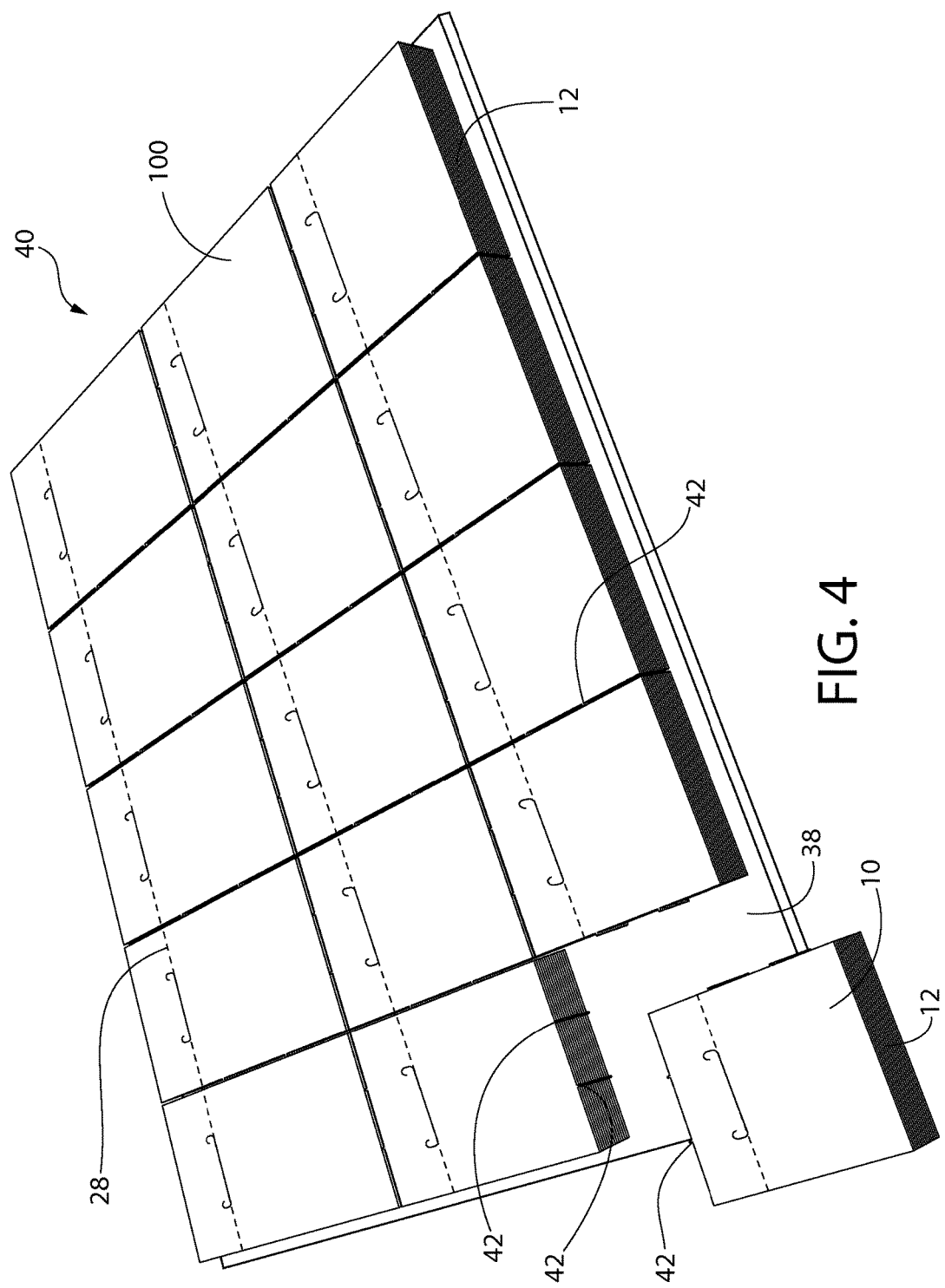
FIG. 4 is a perspective view of the plurality of pads of labels of FIG. 3 shown with one of the pads detached from the support surface.

Referring to FIGS. 3 and 4, multiple labels 10 may be stacked into a pad 12 such that each individual label 10 may be peeled from the pad 12 and used directly, such as attached to a store shelf. Thus, the pad 12 may eliminate dozens of hours that store personnel traditionally spend each week breaking down sheets of labels by tearing along the label-removal perforations, sorting the individual labels, and containerizing or bundling the individual labels before installation.

The pad of labels 12 may provide further time savings and waste minimization by eliminating the release liner 22 from the individual labels 10. In one embodiment, using a label 10 requires removing a label 10 from the pad of labels 12 and affixing it to an article such as a store shelf using the exposed adhesive strip 24. Because the individual labels 10 in the pad 12 adhere to one another without any intermediate release liner 30, the labels 10 may be referred to as "peel-and-stick." Thus, embodiments of the present invention may eliminate the need for store personnel to peel away and discard a separate release liner 30 before installing a label 10.

Further, the pad of labels 12 may be sequenced according to a store's planogram. That is, the labels 10 may be arranged within the pad 12 and the pads 12 may be arranged relative to one another by taking into account the store's planogram, such that store personnel tasked with installing the labels 10 need only walk down a store aisle, peel the labels 10 from the pad 12, and affix them to the store shelves as they proceed down the aisle.

Referring to FIGS. 3 and 4, though a single pad 12 may be provided by stacking single labels 10 on top of one other, in some embodiments a plurality of pads 12 may be partially connected by stacking sheets of partially connected labels 100. The pads 12 may be partially connected to one another so that a single pad of labels 12 can be easily detached from the remaining pads 12. A plurality of pads 12 may be provided, in some embodiments, where the store is large and/or to further organize the labels 10. For example, each shelf or aisle in a store may be provided as a separate pad of labels 12. Each collection of pads 40 may include any number of pads 12. The pads 12 may be arranged into a matrix array having rows and columns of pads 12. In one embodiment, each collection of pads 40 includes 15 pads 12 arranged into five columns and three rows. In one embodiment, the number of pads 40 is the maximum number of pads 40 that can be produced from a sheet that is approximately 11 inches wide by approximately 13 and ⅞ inches long. In one embodiment, the plurality of pads 12 are provided on top of a board or backer 38 to form a set or collection of pads 40. In one embodiment, the backer 38 is an 8 point coated-one-side cardstock material that has a release laminate applied to a top surface. The backer 38 may extend horizontally further than the pads 12 along at least one edge of the pads 12. In one embodiment, the backer 38 extends horizontally further than the pads 12 in order for a user to more easily grasp the backer 38 while removing a pad 12 from the backer 38.

The backer 38 may be provided to help keep the pads 12 joined to one another and help to provide stiffness to the plurality of pads 12. In one embodiment, the backer 38 includes a release coating similar to release coating 36 and each pad 12 is coupled to the top surface of the backer 38 by the exposed adhesive strip 22 of the bottom-most label 10. The backer 38 may include printed data, including without limitation, the store for which the labels 10 are intended and the location or locations within the store where the labels 10 are to be installed.

Each pad 12 may be coupled to one another by one or more connections or ties 42 between adjacent labels. In one embodiment, the ties 42 are formed by not cutting along an entire length of the boundary between labels 10 during the cutting process, as described in further detail below. In one embodiment, two adjacent labels 10 are connected to one another by two ties 42. Fewer or additional ties 42 to couple adjacent labels 10 may be used. In one embodiment, each tie 42 is less than approximately 0.03 inches wide in a direction parallel to the connected edges of the labels 10. In one embodiment, each tie 42 is approximately 0.02 inches wide in a direction parallel to the connected edges of the labels 10. In one embodiment, each tie 42 closest to the perimeter of the sheet of labels 100 is approximately 0.02 inches wide in a direction parallel to the connected edges of the labels 10 and each of the other ties 42 is approximately 0.025 inches wide in a direction parallel to the connected edges of the labels 10. Having a tie that is greater than 0.03 inches wide in a direction parallel to the connected edges of the labels 10 may become difficult to tear, especially with taller pads 12. A pad of labels 12 may be released from the backer 38 by grasping the pad 12 and pulling upwardly and outwardly from the remaining pads until each of the ties 42 are torn.

Each sheet of labels 100 may be aligned with the immediately underlining sheet of labels 10 during stacking of the sheets of labels 10. Because of the exposed adhesive strips 22 and the ties 42 connecting horizontally adjacent labels, picking up each sheet and placing into proper alignment with a stack of sheets as described in further detail below may result in a more precisely aligned pad of labels as compared to a pad 12 formed by simply feeding the sheet of labels 10 into a stack.

In one embodiment, each of the outer perimeters of the sheets of labels are vertically aligned with one another. In one embodiment, each of the outer perimeters of the sheets of labels are vertically aligned with one another without having to trim the pads of labels after they are stacked. In one embodiment, each of the outer perimeters of the sheets of labels are stacked on top of one another to be within +/− approximately ⅓₂ of an inch from a vertical reference line extending perpendicular from the backer 38.

The method of making a pad of labels may include providing a substrate having printed display material on a top surface of the substrate, a first layer of lamination material on a bottom surface of the substrate, a second layer of lamination material having a release coating on the top surface of the substrate, and an adhesive strip on the bottom surface of the first layer of lamination material, the adhesive strip being covered by a liner material in accordance with the embodiments disclosed above. The method may include cutting the substrate into at least one label. In one embodiment, cutting the substrate includes cutting through the substrate and the first and second layer of lamination material around an entire outer perimeter of a plurality of partially connected labels. In one embodiment, cutting the substrate includes cutting through the substrate along a majority of a boundary between adjacent labels leaving one or more ties to partially connect adjacent labels. In one embodiment, cutting the substrate includes leaving the liner material at least partially intact. In one embodiment, the substrate cutting process is performed using a rotary die.

The method may include removing the liner material to expose the adhesive strip after cutting the substrate into at least one label. The method may include pulling the at least partially intact liner downwardly from the at least one labels and winding the at least partially intact liner onto a spool. The method may include pulling a trim surrounding the entire outer perimeter of the plurality of partially connected labels upwardly from the plurality of partially connected labels and winding the trim onto a spool.

The method may include arranging the labels into a pad of labels. In one embodiment, the labels are arranged by transporting the at least one label to a stacking station using a transfer conveyor having non-stick coated rollers. In one embodiment, the labels are arranged by transporting the at least one label which includes using a robot arm having a vacuum pick-head to lift the at least one label and place the at least one label onto the top of the pad of labels. In one embodiment, air is blown onto the at least one label during transporting of the at least one label to the stacking station. Additional methods and method steps are disclosed below in reference to uses of the exemplary machinery.

Figure 5:
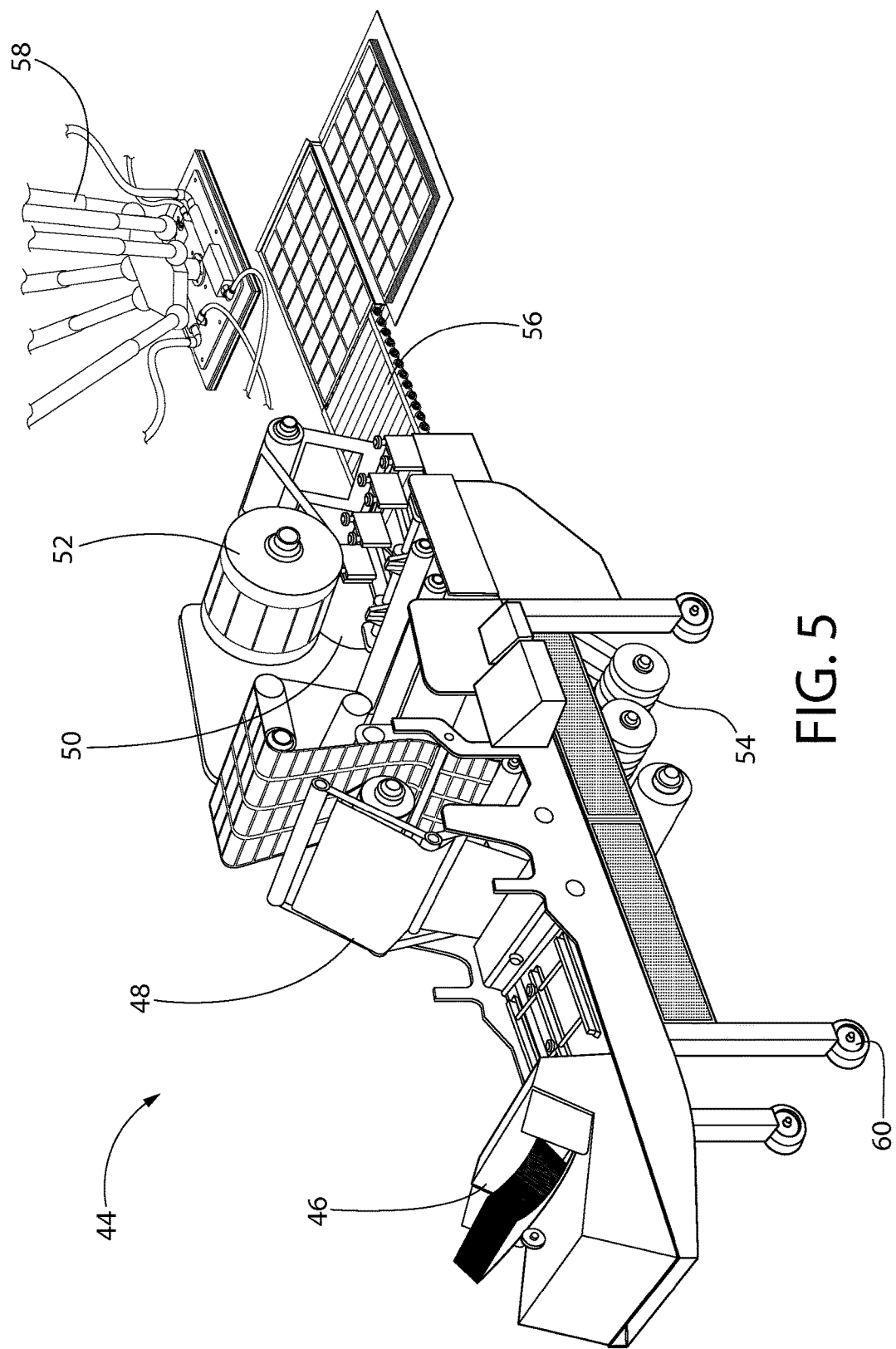
FIG. 5 is a perspective view of a label assembly and stacking machine in accordance with an exemplary embodiment of the present invention.

Referring to FIGS. 5-14, a label assembly and stacking machine 44 may be provided for assembling, cutting and stacking the labels 10 into pads 12. In one embodiment, the label assembly and stacking machine 44 includes a plurality of stations such as a feeding station 46, a laminating station 48, a die cutting station 50, a first unwinding station 52, a second unwinding station 54, a conveyor station 56 and a stacking station 58. Each of the stations may be coupled to one another in a single location similar to the machine 44 as illustrated in FIG. 5 to provide a continuous processing of the labels. In one embodiment, the machine 44 automatically assembles, cuts and stacks the labels 10 into pads 12 without the need for human assistance or interaction during the process. The machine 44 may include wheels 60 such that the machine 44 may be moved, either as a whole, or to split apart the various stations from one another, such as for allowing for repairs. In other embodiments, one or more of the stations is provided remotely or separately from the other stations and an intermediate step, such as shipping the partially processed labels to another location for further processing, may be desired or required.

Figure 6:
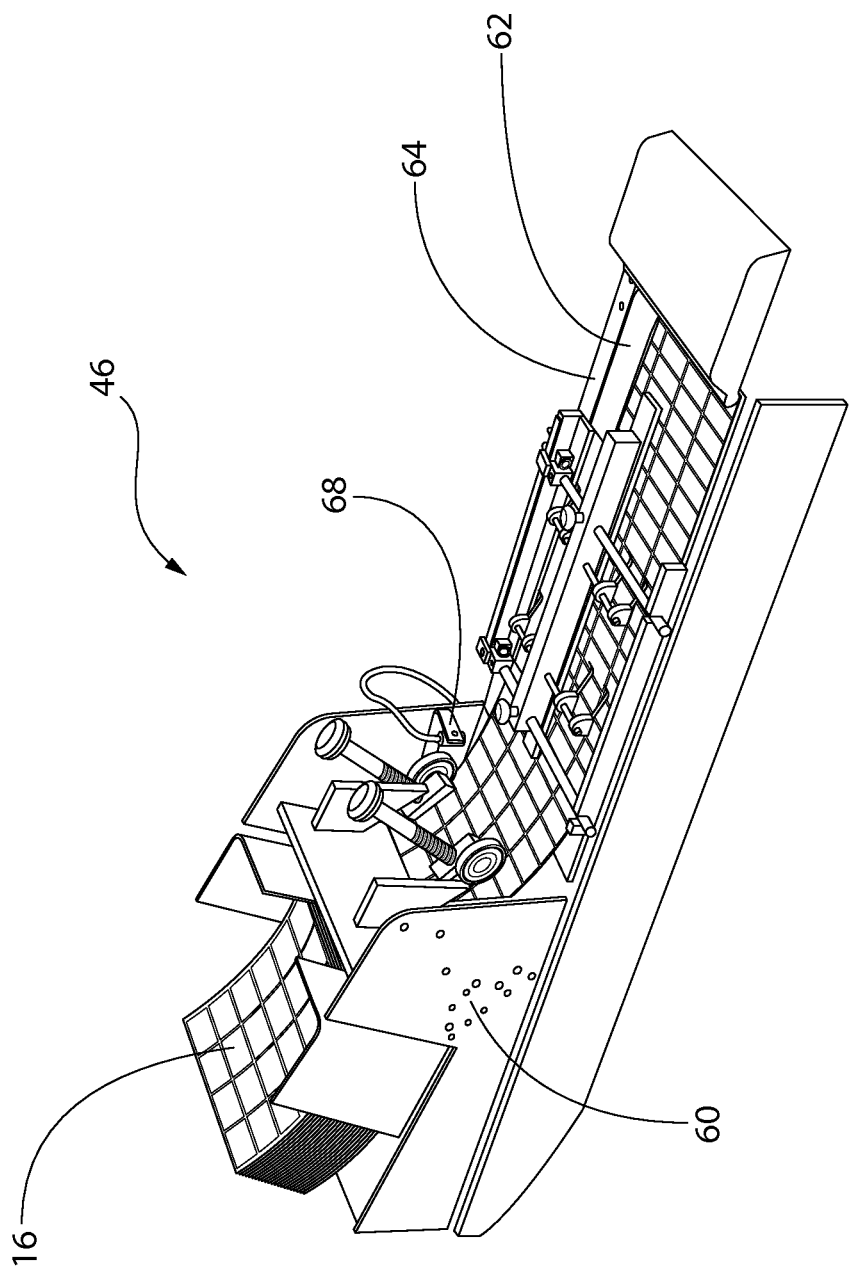
FIG. 6 is a perspective view of the feeding station of the label assembly and stacking machine shown in FIG. 5.

Referring to FIG. 6, an exemplary feeding station 46 is shown. Another machine or a user may load a stack of sheets of paper substrate 16 into a bottom-fed friction feeder 60. A number of feeding mechanisms known in the art may be used in accordance with the present invention to feed substrate material 16 into the laminating station 48 (FIG. 7), including without limitation, bottom-fed and top-fed friction feeders. The sheet of paper substrate 16 may have preprinted on its top surface display information as discussed above, which may include, without limitation, product information, descriptions, marketing content, store and shelf location, pricing, discounts and promotions, UPCs and bar codes, and effective dates. In other embodiments, paper substrate 16 is provided on a continuous roll.

The bottom-fed friction feeder 60 may feed the sheet of paper substrate 16 onto a belt 62, which may carry the sheet of paper substrate 16 along a table 64. The table 64 may include adjustable guides 66 to orient the sheet of paper substrate 16. The table 64 may also include one or more sensors 68 that detect the location of the leading edge of the sheet of paper substrate 16 over time. The laminator 70 may adjust the speed of the transport so that the sheet of paper substrate 16 has proper registration as it enters the lamination web.

Figure 7:
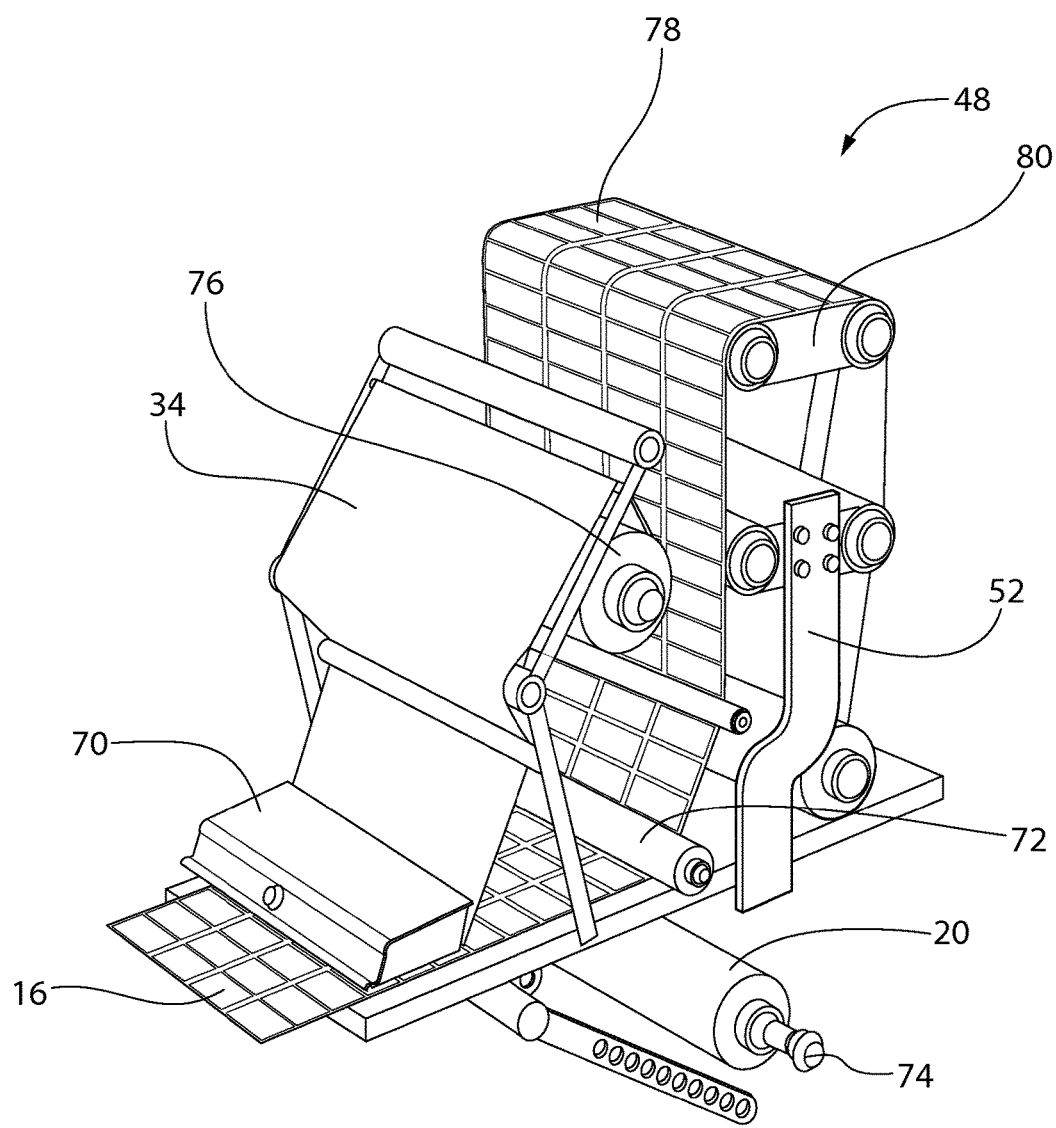
FIG. 7 is a perspective view of the lamination station of the label assembly and stacking machine shown in FIG. 5.

FIG. 7 shows an exemplary lamination station 48. The sheet of paper substrate 16 may enter the laminator 70 and then a first nip roller station 72 where it becomes part of a continuous roll, or web, of material 72. The sheet of paper substrate 16 may join a roll of polypropylene film, which serves as the first layer of lamination material 20 on the bottom surface of the paper substrate 16. The roll of polypropylene film may be fed from a first laminate station 74. The polypropylene film 20 may be affixed to the bottom surface of the paper substrate 16 through use of an adhesive 18. As previously described, the polypropylene film may allow an adhesive strip 22 to permanently adhere to the bottom surface of the first layer of lamination material 20. Thus, the adhesive strip 22 may stay entirely on the bottom surface of a label 10 when it is peeled from a pad of labels 12, and little to no adhesive residue is left behind on the top surface of the label 10 directly below.

Additionally, the sheet of paper substrate 16 may join a roll of polyester film, which serves as the second layer of lamination material 34 on the top surface of the paper substrate 16. The roll of polyester film may be fed from a second laminate station 76. The polyester film may be affixed to the top surface of the paper substrate 16 through use of an adhesive 34. The polyester film forming the second layer of lamination material may incorporate a release coating 36 on its top surface. As previously described, the release coating 36 may allow the adhesive strip 22 on the bottom surface of one label 10 to be cleanly and easily peeled from the top surface of the label 10 directly beneath it, without any risk of tearing the labels 10 or leaving adhesive residue behind. Accordingly, the sheet of paper substrate 16 is suspended in a web of material 78 created by continuous rolls of lamination material.

The web of material 78 may next travel through a web tensioning station 80 that ensures that proper and consistent tension is maintained in the web 78 throughout the process. A web control guide 82 may sense the edge of the web of material 78 and pivot in order to eliminate any skewing and to ensure that the sheet of paper substrate 16 suspended within the web of material 78 enters the die station in the proper orientation, e.g. with the leading edge parallel to an axis of the die roller.

If the web of material 78 does not already include the adhesive strips 22, the adhesive strips 22 are coupled to the bottom surface. As discussed above, the adhesive strips 22 may include a release liner 30. The release liner 30 may prevent the adhesive strip 22 from sticking to the machinery 44 and/or leaving a sticky residue on any of the machine parts.

Figure 8:
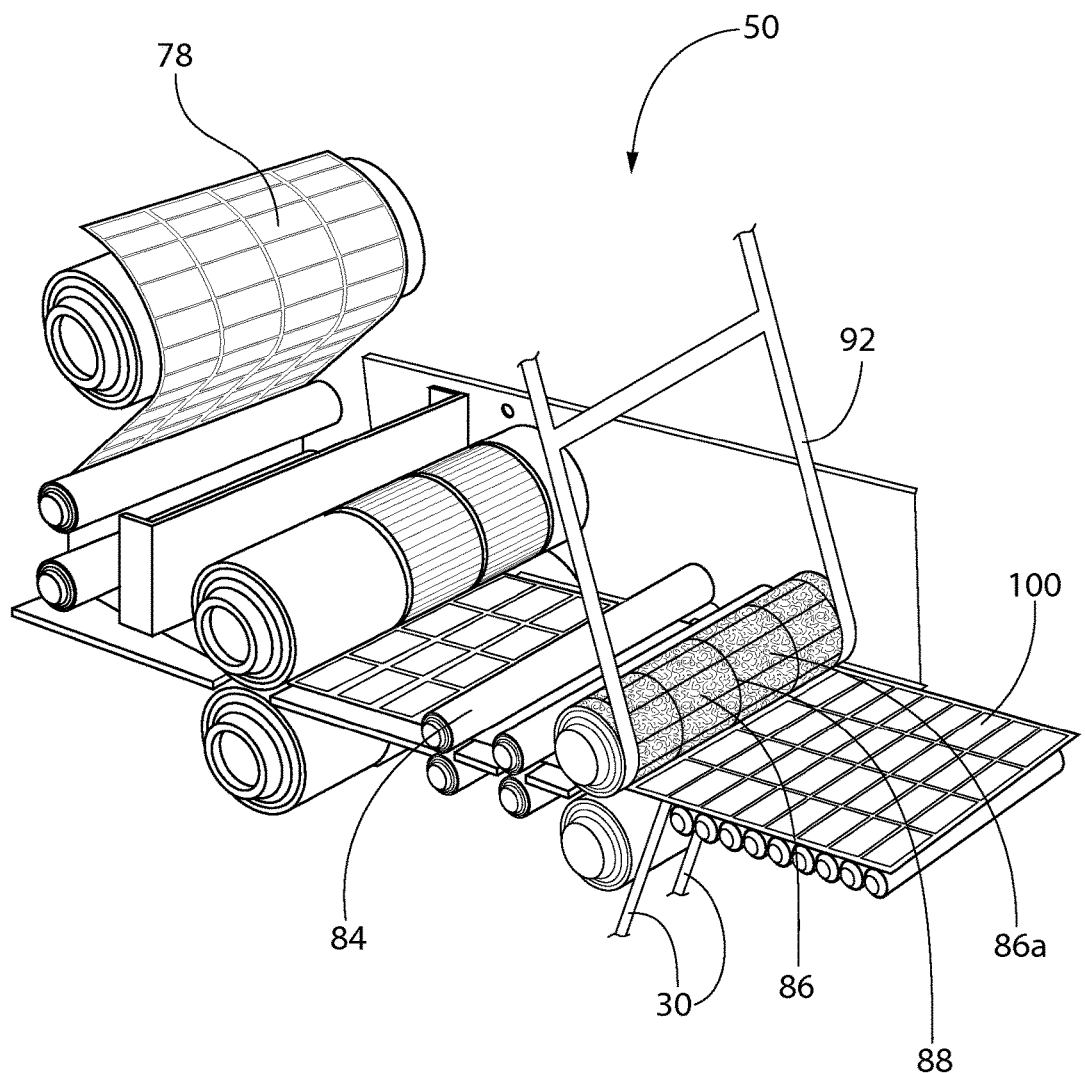
FIG. 8 is perspective view of the die cutting station of the label assembly and stacking machine shown in FIG. 5.

FIG. 8 shows an exemplary die cutting station 50. The die cutting station 50 includes a die 86. The die 86 may include one or more blades for cutting the web of material 78 into a plurality of labels 10. In one embodiment, the die 86 includes a matrix of blades for trimming, cutting, and perforating the web of material 78 to produce a particular size and configuration of labels 100. The die cutting station 50 may include one or more pairs of tensioning rollers 84 to tension and position the web of material 78 before the web of material 78 is fed into die 86. The die 86 may be coated with a foam layer 86a extending between the blades for providing pressure on the surface of the web of material 78 and controlling static as the web of material 78 passes through the die 86. In one embodiment, the foam layer 86a is comprised of an anti-static foam. In one embodiment the foam layer 86a is approximately 1/16 of an inch thick.

Figure 9A:
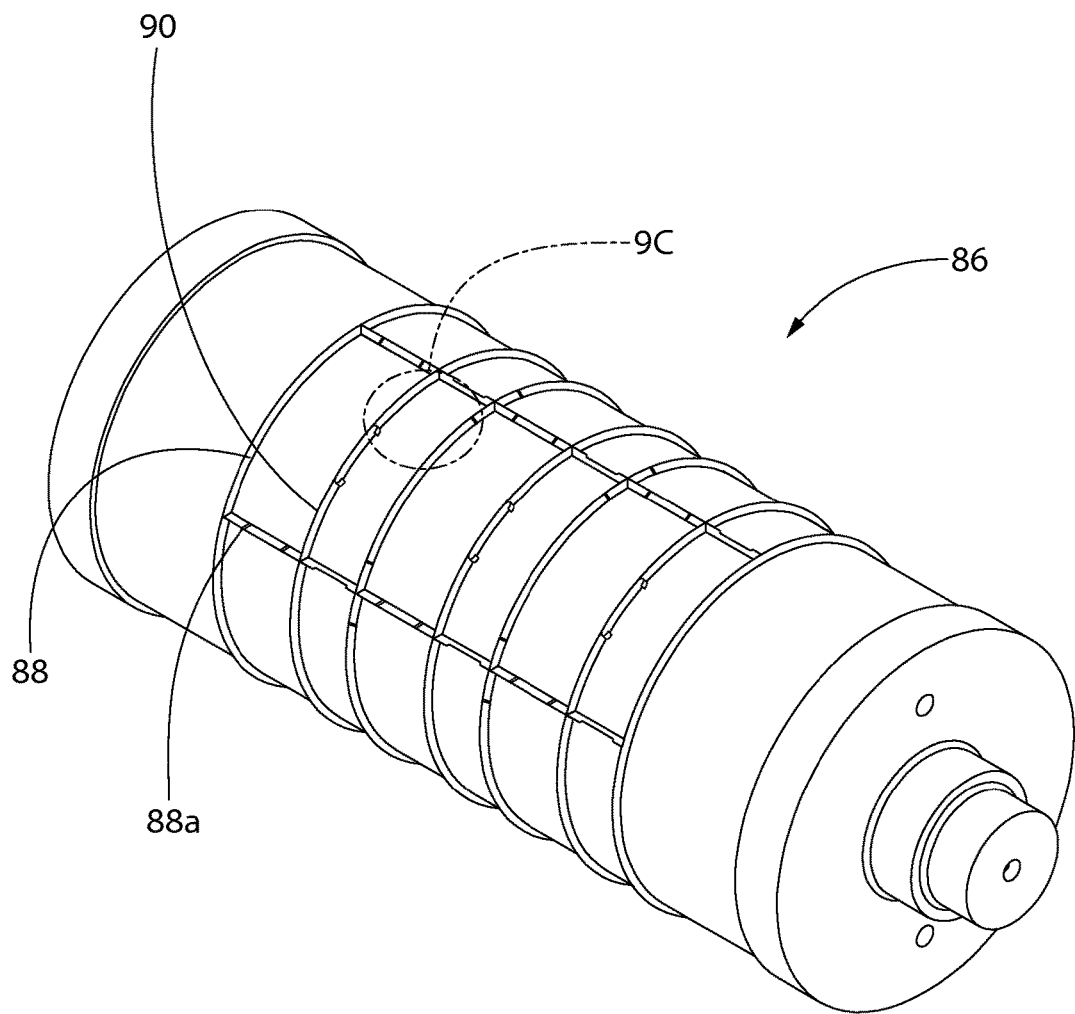
FIG. 9A is a perspective view of a die from the die cutting station of FIG. 8 shown with the foam coating removed.
Figure 9B:
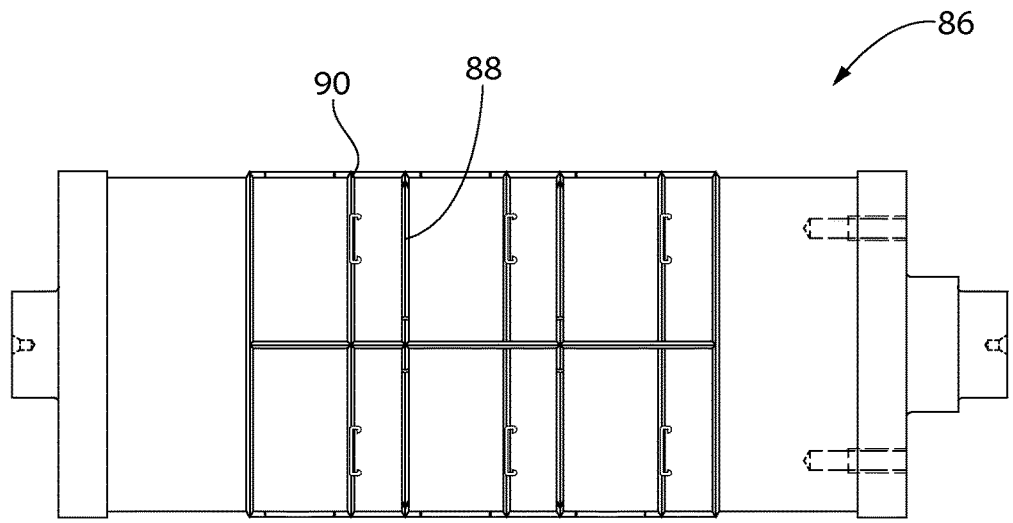
FIG. 9B is a side view of the die shown in FIG. 9A.
Figure 9C:
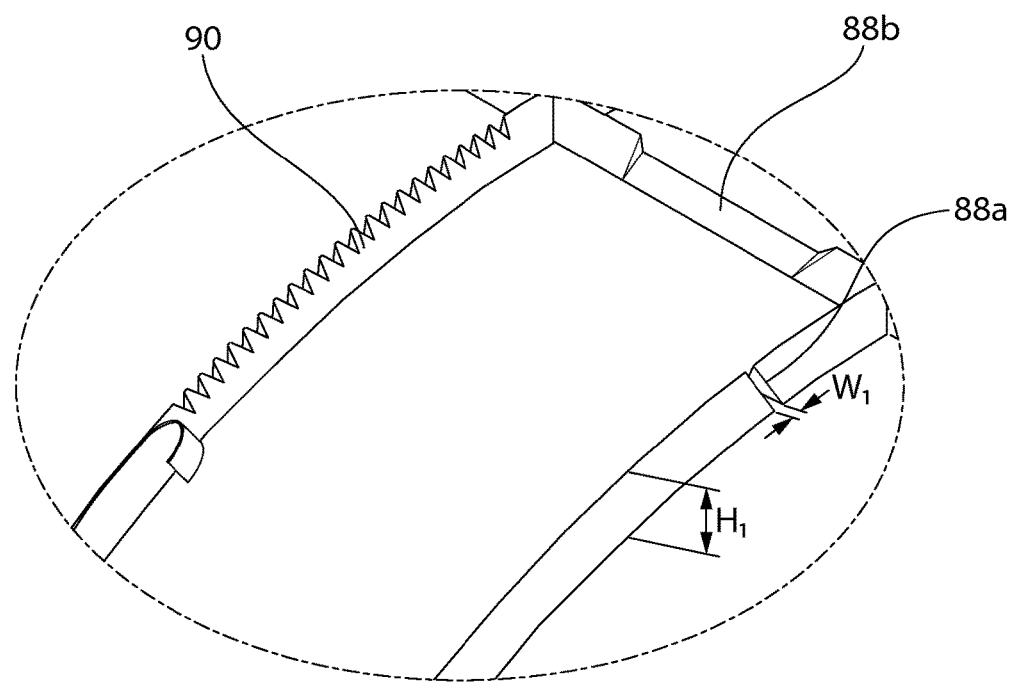
FIG. 9C is an enlarged view of area 9C shown in FIG. 9A.
Figure 10:
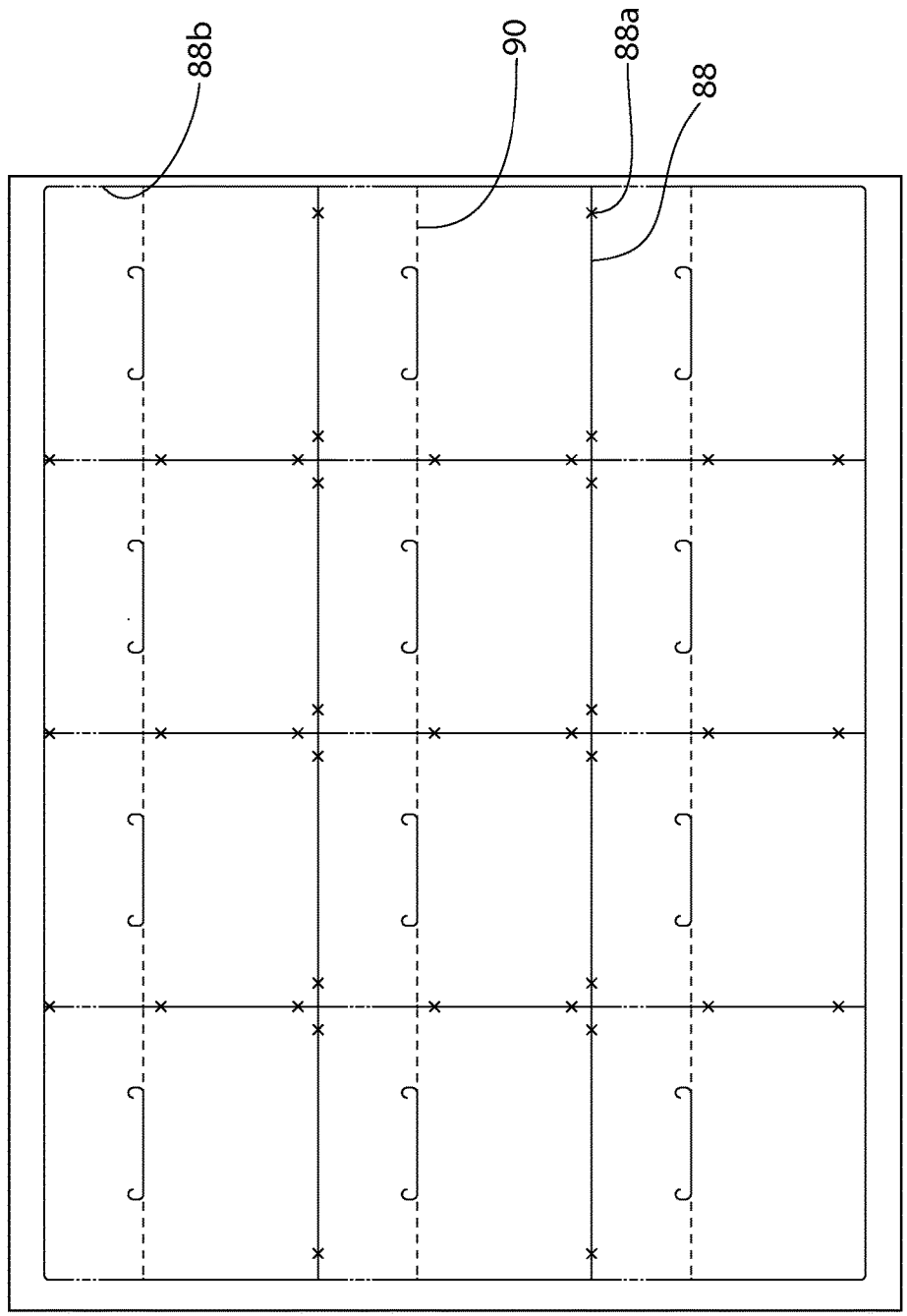
FIG. 10 is a schematic layout drawing of the die blades for the die station shown in FIG. 8.

Referring to FIGS. 9A-9C, a first blade 88 may be used to make cuts that extend entirely through the web of material 78, such as around the perimeter and between adjacent labels. A second blade 90, such as a serrated blade, may be used to make perforated cuts such as relief perforations 28 (see FIG. 1). The first blade 88 may include gaps 88a for creating the ties 42 (see FIG. 2) discussed above. In one embodiment, the gaps 88a are approximately 0.02 inches wide. In one embodiment, the gaps 88a are smaller proximate the perimeter (e.g., approximately 0.02 inches wide) and larger toward the interior (e.g. approximately 0.025 inches wide) of the pattern. The first blade 88 may include a reduced height section 88b to only partially cut through certain layers of the web of material 78 also referred to as a kiss cut. In one embodiment, the reduced height section cuts through all layers of the web of material except for the release liner 30. The kiss cuts may help to keep the release liners 30 attached to one another and streamline removal of the release liner 30. In one embodiment, the first blade 88 has a height of approximately 0.4 inches. In one embodiment, the reduced height section 88b has a recess (i.e. a clearance) of approximately 0.0024 inches from the top of the first blade 88. FIG. 10 illustrates an exemplary pattern of the die 86 in 2D.

After the web of material 78 has been cut into a sheet 100 of partially connected labels 10 by die 86, the perimeter trimmings and the release liner may be removed. In one embodiment, the perimeter trimmings 92 are removed from the labels 10 upwardly and the release liner 30 is removed from the labels 10 downwardly.

Figure 11:
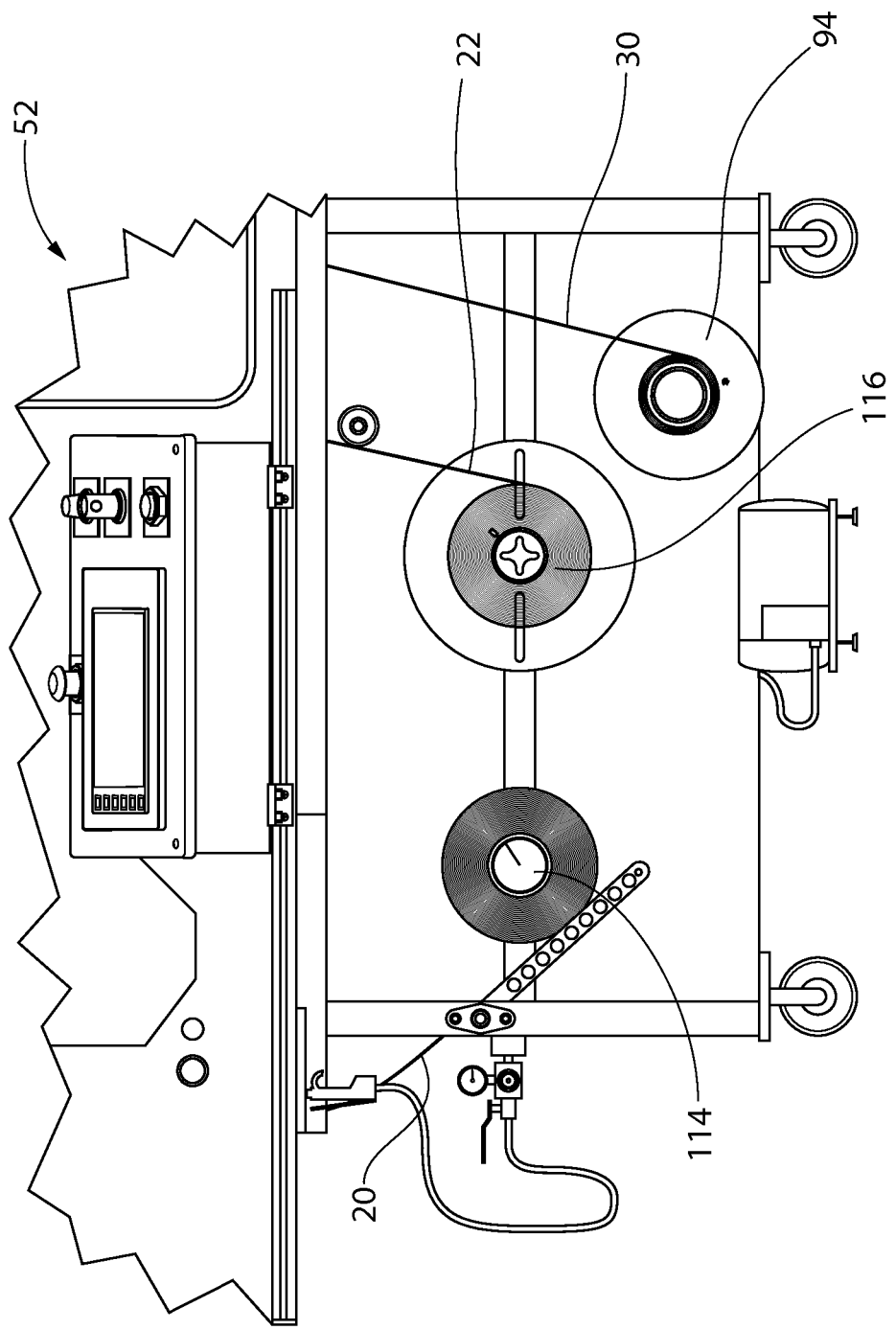
FIG. 11 is a perspective view of a first unwinding station of the label stacking machine shown in FIG. 5.

Referring to FIG. 11, an exemplary first unwinding station 52 is shown. The first unwinding station 52 may gather and unwind the release liner 30 from the adhesive strips 22. The release liner 30 may be rewound onto one or more mandrels 94 to collect the release liner 30. Once fully wound, the mandrels 94 may be discarded or the release liners 30 may be reused. Once exposed, the adhesive strips 22 will not come in contact with any part of the label assembling and stacking machine 44 throughout the remaining steps in the manufacturing process, except for the transfer rollers 98. Also shown in FIG. 11 is the roll 114 of bottom laminate material 20 and the roll 116 of adhesive strips 22.

Figure 12:
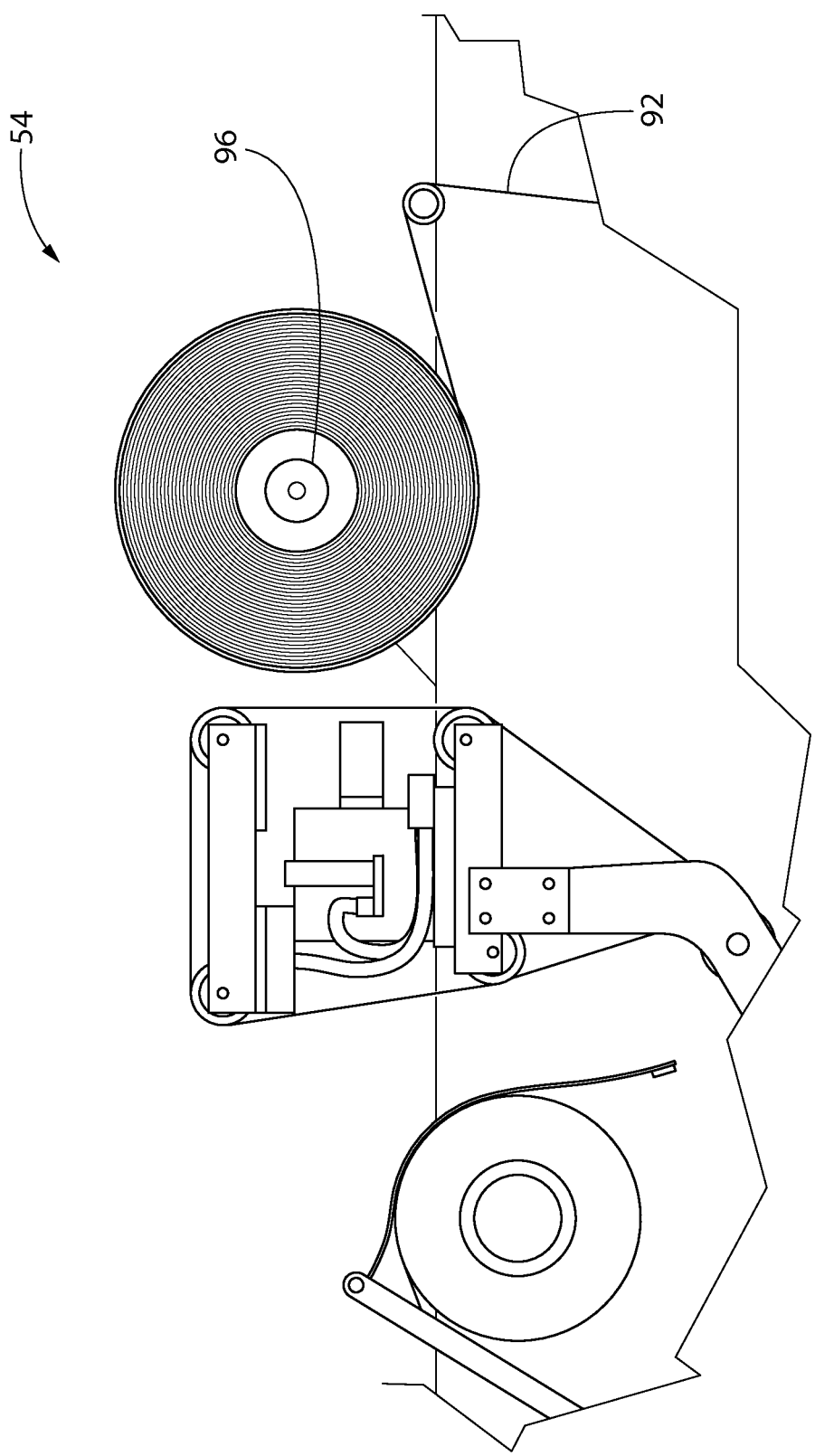
FIG. 12 is a perspective view of a second unwinding station of the label stacking machine shown in FIG. 5.

Referring to FIG. 12, an exemplary second unwinding station 54 is shown. The second unwinding station 54 may gather and unwind excess first lamination material 20, second lamination material 34, and paper substrate 16 (collectively, trim 92) that is trimmed away. The trim 92 may include the web of material 78 that surrounds the sheet of labels 100. In one embodiment, the trim 92 is in the shape of a continuous ladder (see FIGS. 5 and 8). The trim 92 may be rewound onto one or more mandrels 96 to collect the trim 92. Once fully wound, the mandrels 96 may be discarded. The sheet of partially connected labels 100 is now ready for stacking. By keeping the release liner 30 on through the cutting process, both the adhesive strips 22 and the die 86 are protected during processing of the web of material 78.

Figure 13:
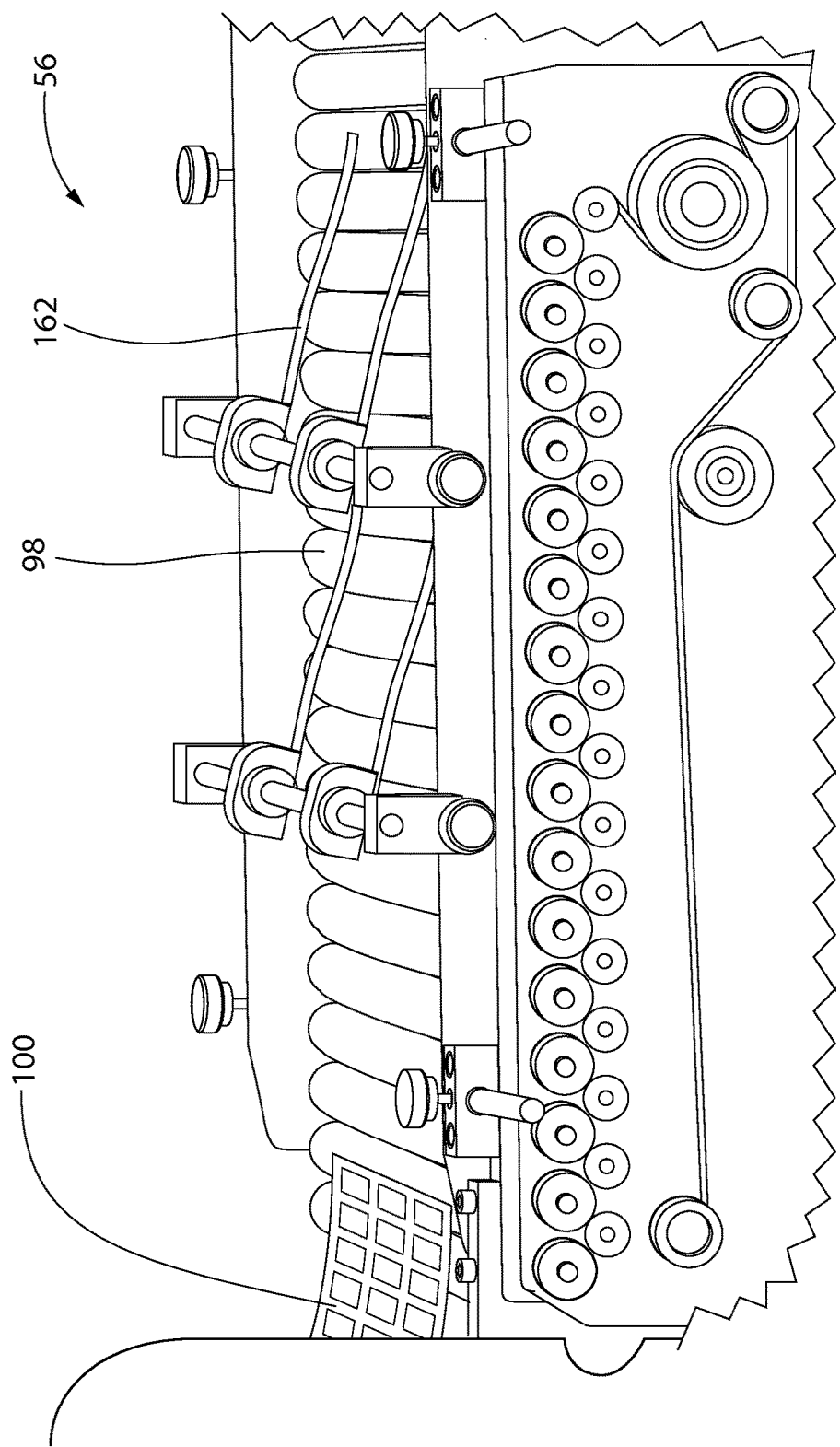
FIG. 13 is a perspective view of a conveyor station of the label stacking machine shown in FIG. 5.
Figure 14:
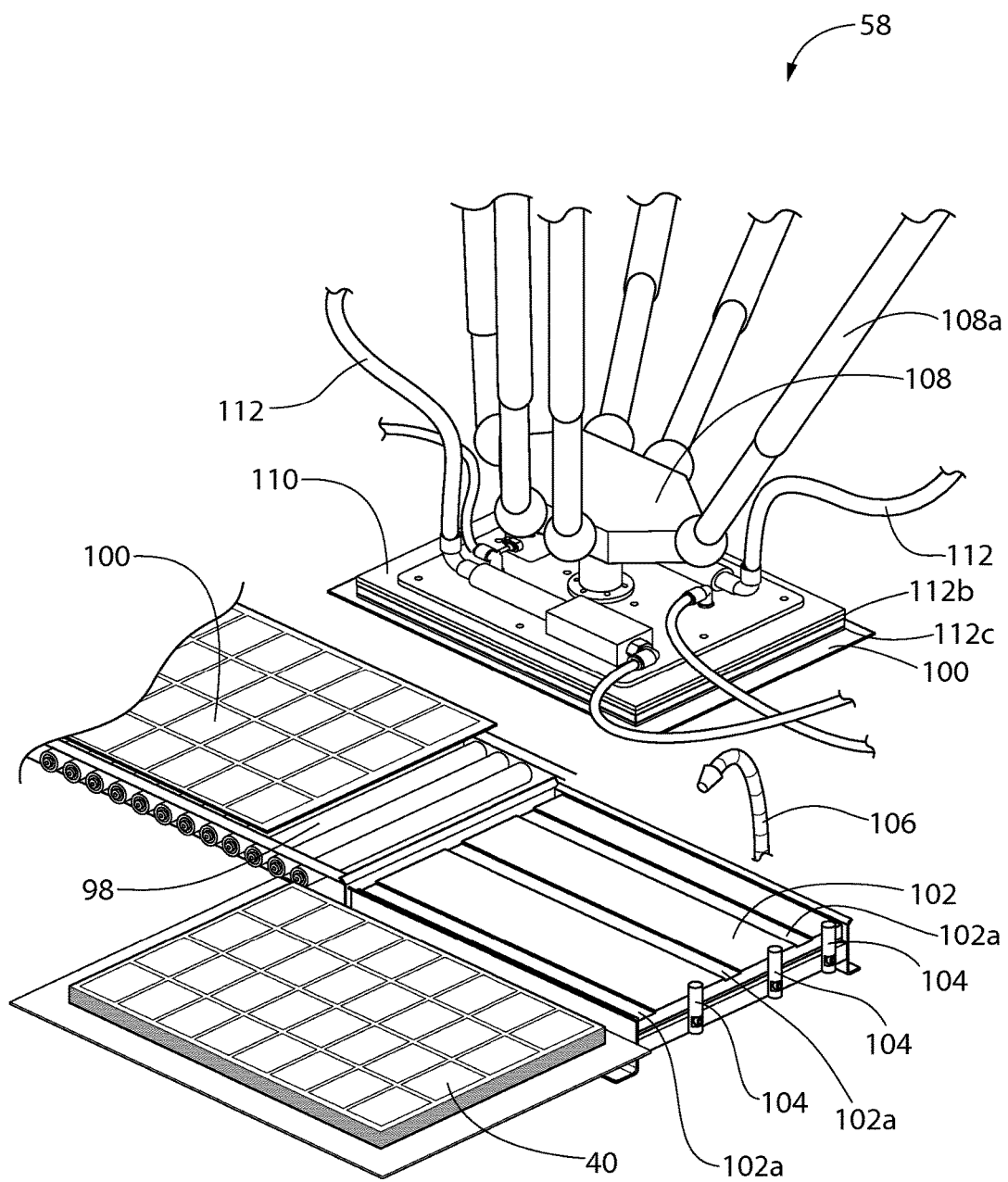
FIG. 14 is a perspective view of a stacking station of the label stacking machine shown in FIG. 5.

Referring to FIG. 13, an exemplary conveyor station 56 is shown. The conveyor station 56 may include a plurality of rollers 98 that transfer the sheet of labels 10 from the die cutting station 50 to the stacking station 58 (FIG. 14). In one embodiment the rollers 98 are coated with a non-stick coating, such as a rubberized non-stick plasma coating, such that the exposed adhesive strips 22 do not adhere to the rollers 98. The conveyor station 56 may include one or more hold down tabs 162 that help to insure that the sheets of labels 100 stay in contact with the rollers 98 during transport. In alternative embodiments, the conveyor station 56 may be shortened or omitted. In another embodiment, a moveable platform transfers the sheet of labels 100 from the die cutting station 50 to the stacking station 58. In another embodiment, the sheet of labels 100 is transferred directly from the die cutting station 50 to the stacking station 58.

Figure 15:
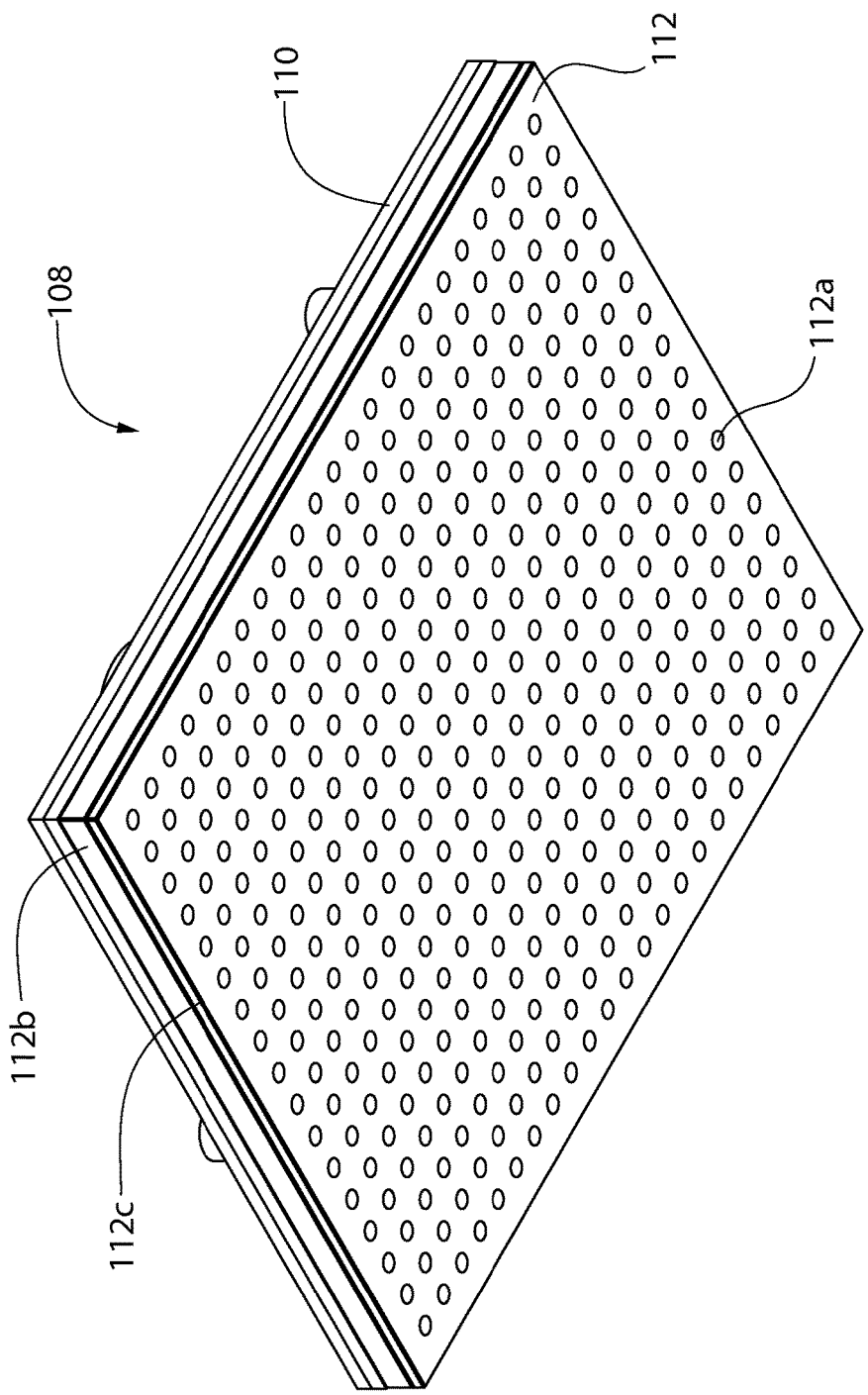
FIG. 15 is a bottom perspective view of the pick-head plate of robot arm in the stacking station shown in FIG. 14.

Referring to FIGS. 14 and 15, an exemplary stacking station 58 is shown. The stacking station 58 may include a transfer bin 102 for receiving the sheet of labels 100 from the conveyor station rollers 98. The transfer bin 102 may include one or more guides 104 at an end of the transfer bin 102 to engage the leading edge of the sheet of labels 100 and direct the sheet of labels 100 into the transfer bin 102. In one embodiment, the guides 104 comprise a plurality of padded posts. Additional guides 104 may be provided around the lateral sides of the transfer bin 102. The transfer bin 102 may include one or more grooves or recesses 102a. The grooves or recesses 102a may be sized and oriented to align with the adhesive strips 22 of the sheet of labels 100 such that the adhesive strips 22 do not contact the transfer bin 102. The stacking station 58 may include one or more air nozzles 106 adjacent to the stacking station to blow air on the sheet of labels 100 and help keep the sheet of labels 100 on the rollers 98 and/or direct the sheet of labels 100 into the transfer bin 102.

Because the sheet of labels 100 is flexible and includes a plurality of apertures (e.g., the cuts between adjacent labels and the perforations) and the bottom surface includes exposed adhesive strips 22, it may be difficult to accurately place the sheet of labels 100 into a precise stack or collection of pads 40. Once the sheet of labels 100 is positioned in the transfer bin 102, a robot arm 108 may be used to pick up the sheet of labels 100 and accurately place the sheet of labels 100 onto a stack or collection of pads 40.

The robot arm 108 may include one or more struts 108a to precisely move a pick-head or plate 110. In one embodiment, the robot arm 108 includes six struts 108a. The robot arm 108 may have at least one vacuum source configured to selectively supply a vacuum force to the sheet of labels 100. The vacuum source may be provided by one or more conduits 112, such as tubes, configured to pull and release a vacuum through the plate 110. In one embodiment, the vacuum force is approximately 10 psi. In one embodiment, the vacuum force is approximately 9 psi to approximately 11 psi. In one embodiment, the vacuum force is at least approximately 9 psi. In one embodiment, the vacuum force is less than approximately 11 psi.

The plate 110 may include a resilient or flexible pad 112. In one embodiment, the flexible pad 112 is provided to protect the labels 10 from being damaged by plate 110. In one embodiment, the flexible pad 112 is comprised of foam. The flexible pad 112 may be comprised of two or more layers having different durometers. In one embodiment, the foam includes a top layer of closed cell foam 112b and a bottom layer of open cell foam 112c. In one embodiment, the bottom layer of foam 112c provides greater conformity to the perforations and cuts in the sheet of labels 100 while the top layer of foam 112b allows for greater vacuum generation. In one embodiment, the top layer of foam 112b is a closed cell, medium density, polyurethane foam. In one embodiment, the top layer of foam is approximately ⅜ of an inch thick. In one embodiment, the bottom layer of foam 112c is an open cell, low density foam. In one embodiment, the bottom layer of foam is approximately ⅙ of an inch thick.

In one embodiment, the plate 110 and the flexible pad 112 are generally the same size and shape. In one embodiment, the plate 110 and the flexible pad 112 are generally rectangular. In other embodiments, the plate 110 and the flexible pad 112 are any shape include round, oval, triangular and square. In one embodiment, the plate 110 and the flexible pad 112 are generally the same size and shape as the sheet of labels 100. In one embodiment, the plate 110 and the flexible pad 112 are smaller than the sheet of labels 100.

The flexible pad 112 may include a plurality of apertures 112a extending through the flexible pad 112 and configured to direct the majority of the vacuum force through the flexible pad 112 and to the surface of the sheet of labels 100. The apertures 112a may be approximately 5 mm in diameter and approximately ¾ inch apart from center to center. In one embodiment, the apertures 112a are arranged in an array of aligned rows and columns. In other embodiments, the apertures 112a are arranged in rows that are offset from adjacent rows. In other embodiments, the apertures 112a are sized, spaced and arranged depending on the label size and layout of the sheet of labels 100. In one embodiment, the apertures 112a are positioned so that they do not substantially intersect a cut or perforation in the sheet of labels 100. In one embodiment, even if some of the apertures 112a intersect with a cut or perforation in the sheet of labels 100, there are a sufficient number of apertures 112a that do not intersect with a cut or perforation in the sheet of labels 100 allowing for the vacuum force to hold the sheet of labels 100 in contact with the flexible pad 112.

Once a sheet of labels 100 is in the transfer bin 102, the robot arm 108 may come down over top of the sheet of labels 100 and contact the bottom of the flexible pad 112 to the top surface of the sheet of labels 100. A vacuum force may be drawn through the plurality of apertures 112a to hold the sheet of labels 100 onto the flexible pad 112. The robot arm 108 may then be lifted to pick up the sheet of labels 100 and position the sheet of labels 100 onto the top of and in aligned with the collection of pads 40. In one embodiment, the vacuum force is continuously drawn through the flexible pad 112 to retain the sheet of labels 100 until the sheet of labels 100 is stacked into place. Once stacked, the adhesive strip 22 on the bottom surface of each label 10 adheres to the top surface of the label 10 below it, resulting in a pad 12 of peel-and-stick labels 10. The vacuum force drawn through the flexible pad 112 may then be released and the robot arm 108 returns toward the transfer bin 102 to pick up another sheet of labels 100. This process may be repeated until a desired number of sheets of labels 100 are stacked. The robot arm 108 may be controlled by a computer that is preprogrammed to automatically pick up and place the sheet of labels 100 in a quick and precise manner.

The printing, cutting, and stacking processes described above and depicted in FIG. 5-14 may be controlled by taking into account the store's planogram, such that the finished pad of labels 12, 40 are sequenced according to the store's planogram. Thus, the store personnel tasked with installing the labels 10 need only walk down a store aisle, peeling the labels 10 from the pad 12, and affixing them to the store shelves.

In one embodiment, the system includes one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. Unless specifically set forth herein, the terms "a," "an" and "the" are not limited to one element but instead should be read as meaning "at least one."

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. A method of making a pad of labels comprising:
providing a substrate having printed display material on a top surface of the substrate, a first layer of lamination material on a bottom surface of the substrate, a second layer of lamination material having a release coating on the top surface of the substrate, and an adhesive strip on the bottom surface of the substrate, the adhesive strip being covered by a liner material;
cutting the substrate having first and second layers of lamination material affixed into at least one label;
removing the liner material to expose the adhesive strip;
transporting the at least one label to a stacking station;
lifting the at least one label from the stacking station by applying a vacuum force to a top surface of the at least one label;
moving the at least one label over a stack of labels; and
releasing the vacuum force to the top surface of the at least one label to arrange the at least one label into a pad of labels.

2. The method of claim 1, wherein transporting the at least one label includes using a transfer conveyor having non-stick coated rollers.

3. The method of claim 1 further comprising:
blowing air onto the at least one label during transporting of the at least one label to the stacking station.

4. The method of claim 1, wherein the stacking station includes at least one recess that aligns with the adhesive strip to prevent the adhesive strip from contacting the stacking station.

5. The method of claim 1, wherein the vacuum force is applied using a robot arm, the robot arm including a pick-head having a foam pad.

6. The method of claim 4, wherein the foam pad includes a plurality of apertures.

* * * * *